(12) United States Patent
Zhang et al.

(10) Patent No.: US 12,301,306 B2
(45) Date of Patent: May 13, 2025

(54) BEAM SPECIFIC PRE-COMPENSATION FOR WIRELESS DEVICES IN A HIGH SPEED SINGLE FREQUENCY NETWORK

(71) Applicant: QUALCOMM Incorporated, San Diego, CA (US)

(72) Inventors: Danlu Zhang, San Diego, CA (US); Kiran Venugopal, Raritan, NJ (US); Junyi Li, Fairless Hills, PA (US); Wooseok Nam, San Diego, CA (US); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/677,596

(22) Filed: Feb. 22, 2022

(65) Prior Publication Data

US 2023/0268958 A1    Aug. 24, 2023

(51) Int. Cl.
*H04B 7/01*    (2006.01)
*H04B 17/364*    (2015.01)

(52) U.S. Cl.
CPC ............. *H04B 7/01* (2013.01); *H04B 17/364* (2015.01)

(58) Field of Classification Search
CPC ......... H04B 7/01; H04B 17/364; H04B 7/063
See application file for complete search history.

(56) References Cited

U.S. PATENT DOCUMENTS

| | | | |
|---|---|---|---|
| 11,240,779 B2 * | 2/2022 | Wang | H04W 56/003 |
| 2012/0039245 A1 | 2/2012 | Wang et al. | |
| 2012/0113941 A1 | 5/2012 | Chung et al. | |
| 2013/0028221 A1 * | 1/2013 | Seo | H04W 72/21 |
| | | | 370/329 |
| 2014/0036760 A1 | 2/2014 | Ljung | |
| 2017/0079017 A1 * | 3/2017 | Kim | H04W 72/23 |
| 2020/0029353 A1 * | 1/2020 | Xu | H04W 72/21 |
| 2020/0092685 A1 | 3/2020 | Fehrenbach et al. | |
| 2020/0195323 A1 * | 6/2020 | Black | H04W 4/70 |

(Continued)

FOREIGN PATENT DOCUMENTS

| | | | | |
|---|---|---|---|---|
| JP | 2020036069 A | * | 3/2020 | |
| WO | WO-2023038557 A1 | * | 3/2023 | ........... H04B 7/0617 |
| WO | WO-2023186308 A1 | * | 10/2023 | |

*Primary Examiner* — Atique Ahmed
(74) *Attorney, Agent, or Firm* — Guang Y. Zhang; Holland & Hart LLP

(57) ABSTRACT

Methods, systems, and devices for wireless communications are described. A wireless node (e.g., a vehicle mounted integrated access and backhaul (IAB) node) may aid in wireless communication between one or more wireless devices operating in a high-speed environment (e.g., on a high-speed train (HST)) and one or more network entities. The wireless node may transmit one or more reference signals associated with a Doppler estimation procedure to the one or more network entities. The network entities may use the one or more reference signals to generate a set of Doppler compensation parameters to use while communicating with the wireless node and the one or more wireless devices. In some examples, the wireless node may receive control information or data from the one or more wireless devices, aggregate the information, and transmit the aggregated information to the one or more network entities on behalf of the wireless devices.

18 Claims, 14 Drawing Sheets

(56) References Cited

U.S. PATENT DOCUMENTS

| | | | |
|---|---|---|---|
| 2020/0196384 A1* | 6/2020 | Liu | H04W 76/12 |
| 2021/0051545 A1 | 2/2021 | Luo et al. | |
| 2021/0083830 A1 | 3/2021 | Yerramalli et al. | |
| 2021/0307108 A1* | 9/2021 | Babaei | H04W 76/28 |
| 2021/0336658 A1 | 10/2021 | Shimon et al. | |
| 2021/0399863 A1* | 12/2021 | Yu | H04B 17/327 |
| 2022/0069929 A1* | 3/2022 | Berger | H04B 17/364 |
| 2023/0039699 A1* | 2/2023 | Akhavain Mohammadi | H04W 40/20 |

* cited by examiner

BEAM SPECIFIC PRE-COMPENSATION FOR WIRELESS DEVICES IN A HIGH SPEED SINGLE FREQUENCY NETWORK

FIELD OF TECHNOLOGY

The following relates to wireless communications, including beam specific pre-compensation for wireless devices in a high speed single frequency network (SFN).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

SUMMARY

The described techniques relate to improved methods, systems, devices, and apparatuses that support beam specific pre-compensation for wireless devices in a high speed single frequency network (SFN). Generally, the described techniques enable a wireless node to aid in the aggregation of control information or data for one or more associated wireless devices. For example, a user equipment (UE) may operate in a high-speed train (HST) environment. As such, the UE may experience rapid handover across multiple network entities, transmission reception points (TRPs), or beams as the position of the UE changes. In some examples, a wireless network may utilize an SFN such that multiple network entities or TRPs may serve the UE via the same time-frequency resources to mitigate occurrences of latency during handover. Based on the high mobility characteristics of an HST, a UE may experience frequency Doppler shifting with each respective serving network entity for the set of time-frequency resources used in the SFN. In some examples, the wireless node may be capable of generating and transmitting one or more reference signals associated with a Doppler estimation procedure to each serving network entity which the network entities may use to adjust the time-frequency resources to compensate for the speed and angle of wireless devices associated with the wireless node.

In some examples, the wireless node may transmit the one or more reference signals directly to the serving network entities, which may be used while directly communicating with the one or more UEs associated with the wireless node. In some cases, the wireless node may act as a serving node for the one or more UEs. For example, the wireless node may receive control signaling from the UEs, aggregate the control signaling, and transmit the aggregated control signaling to the serving network entities. In such examples, the wireless node may assist in random access and handover for the multiple UEs while the multiple UEs transmit data directly to the serving network entities. In some examples, the wireless node may receive both control information and data from the multiple UEs. In such examples, the wireless node may aggregate control signaling and data separately and act as intermediate serving device between the serving network entities and the multiple UEs.

A method for wireless communications at a wireless node is described. The method may include transmitting one or more reference signals to one or more network entities, the one or more reference signals associated with a Doppler estimation procedure for the wireless node, for a set of wireless devices supported by the wireless node, or for both, receiving a first signal from a first device of the set of wireless devices supported by the wireless node, receiving a second signal from a second device of the set of wireless devices supported by the wireless node, aggregating information from the first signal and the second signal based on receiving the first signal from the first device and receiving the second signal from the second device, and transmitting, to the one or more network entities, a message including the aggregated information from the first signal and the second signal based on the Doppler estimation procedure being for the wireless node, for the set of wireless devices supported by the wireless node, or for both.

An apparatus for wireless communications at a wireless node is described. The apparatus may include a processor, memory coupled with the processor, and instructions stored in the memory. The instructions may be executable by the processor to cause the apparatus to transmit one or more reference signals to one or more network entities, the one or more reference signals associated with a Doppler estimation procedure for the wireless node, for a set of wireless devices supported by the wireless node, or for both, receive a first signal from a first device of the set of wireless devices supported by the wireless node, receive a second signal from a second device of the set of wireless devices supported by the wireless node, aggregate information from the first signal and the second signal based on receiving the first signal from the first device and receiving the second signal from the second device, and transmit, to the one or more network entities, a message including the aggregated information from the first signal and the second signal based on the Doppler estimation procedure being for the wireless node, for the set of wireless devices supported by the wireless node, or for both.

Another apparatus for wireless communications at a wireless node is described. The apparatus may include means for transmitting one or more reference signals to one or more network entities, the one or more reference signals associated with a Doppler estimation procedure for the wireless node, for a set of wireless devices supported by the wireless node, or for both, means for receiving a first signal from a first device of the set of wireless devices supported by the wireless node, means for receiving a second signal from a second device of the set of wireless devices supported by the wireless node, means for aggregating information from the first signal and the second signal based on receiving the first signal from the first device and receiving the second signal from the second device, and means for transmitting, to the one or more network entities, a message including the aggregated information from the first signal and the second signal based on the Doppler estimation procedure being for the wireless node, for the set of wireless devices supported by the wireless node, or for both.

A non-transitory computer-readable medium storing code for wireless communications at a wireless node is described. The code may include instructions executable by a processor to transmit one or more reference signals to one or more network entities, the one or more reference signals associated with a Doppler estimation procedure for the wireless node, for a set of wireless devices supported by the wireless node, or for both, receive a first signal from a first device of the set of wireless devices supported by the wireless node, receive a second signal from a second device of the set of wireless devices supported by the wireless node, aggregate information from the first signal and the second signal based on receiving the first signal from the first device and receiving the second signal from the second device, and transmit, to the one or more network entities, a message including the aggregated information from the first signal and the second signal based on the Doppler estimation procedure being for the wireless node, for the set of wireless devices supported by the wireless node, or for both.

Some examples of the method, apparatuses, and non-transitory computer-readable medium described herein may further include operations, features, means, or instructions for transmitting, to the one or more network entities as part of the Doppler estimation procedure, one or more Doppler compensation parameters associated with the wireless node, one or more wireless devices of the set of wireless devices, or a combination thereof.

Some examples of the method, apparatuses, and non-transitory computer-readable medium described herein may further include operations, features, means, or instructions for transmitting, to the one or more network entities as part of the Doppler estimation procedure, the one or more reference signals using one or more beams, where each beam of the one or more beams may be associated with a respective subset of Doppler compensation parameters of a set of one or more Doppler compensation parameters.

In some examples of the method, apparatuses, and non-transitory computer-readable medium described herein, the one or more reference signals may be based on each wireless device of the set of wireless devices operating in a first communication mode, a second communication mode, or a combination thereof.

Some examples of the method, apparatuses, and non-transitory computer-readable medium described herein may further include operations, features, means, or instructions for receiving, from multiple wireless devices of the set of wireless devices, respective sets of control signals based on the multiple wireless devices operating in accordance with the first communication mode and transmitting the message to the one or more network entities, where the message includes aggregated control information from the respective sets of control signals.

Some examples of the method, apparatuses, and non-transitory computer-readable medium described herein may further include operations, features, means, or instructions for receiving, from multiple wireless devices of the set of wireless devices, respective sets of signals including control information and data based on the multiple wireless devices operating in accordance with the second communication mode and transmitting multiple messages including the message to the one or more network entities, where the multiple messages include a first set of messages including aggregated control information from the multiple wireless devices and a second set of messages including aggregated data from the multiple wireless devices.

In some examples of the method, apparatuses, and non-transitory computer-readable medium described herein, the wireless node may be a vehicle mounted integrated access and backhaul (IAB) node.

Some examples of the method, apparatuses, and non-transitory computer-readable medium described herein may further include operations, features, means, or instructions for transmitting to each network entity of the one or more network entities a respective set of physical parameters, where each respective set of physical parameters includes a location, a speed, and an angle between the wireless node and a network entity associated with the respective set of physical parameters.

In some examples of the method, apparatuses, and non-transitory computer-readable medium described herein, the wireless node communicates with each wireless device of the set of wireless devices via sidelink.

In some examples of the method, apparatuses, and non-transitory computer-readable medium described herein, the wireless node communicates with a given wireless device of the set of wireless devices based on a channel condition between the wireless node and the given wireless device being above a channel condition threshold, a loading condition between the wireless node and the given wireless device being above a loading condition threshold, or both.

In some examples of the method, apparatuses, and non-transitory computer-readable medium described herein, the one or more network entities includes one or more TRPs.

Some examples of the method, apparatuses, and non-transitory computer-readable medium described herein may further include operations, features, means, or instructions for transmitting, to the one or more network entities, signaling indicating that the wireless node and the set of wireless devices may be operating in a speed environment that may be classified as a high-speed environment.

A method for wireless communications at a network entity is described. The method may include receiving, from a wireless node, one or more reference signals associated with a Doppler estimation procedure for the wireless node, a set of wireless devices supported by the wireless node, or both, generating a set of Doppler compensation parameters associated with the wireless node, the set of wireless devices, or a combination thereof based on receiving the one or more reference signals associated with the Doppler estimation procedure, and communicating with the wireless node, at least one wireless device of the set of wireless devices supported by the wireless node, or both based on the set of Doppler compensation parameters.

An apparatus for wireless communications at a network entity is described. The apparatus may include a processor, memory coupled with the processor, and instructions stored in the memory. The instructions may be executable by the processor to cause the apparatus to receive, from a wireless node, one or more reference signals associated with a Doppler estimation procedure for the wireless node, a set of wireless devices supported by the wireless node, or both, generate a set of Doppler compensation parameters associated with the wireless node, the set of wireless devices, or a combination thereof based on receiving the one or more reference signals associated with the Doppler estimation procedure, and communicate with the wireless node, at least one wireless device of the set of wireless devices supported by the wireless node, or both based on the set of Doppler compensation parameters.

Another apparatus for wireless communications at a network entity is described. The apparatus may include means for receiving, from a wireless node, one or more reference signals associated with a Doppler estimation procedure for the wireless node, a set of wireless devices supported by the wireless node, or both, means for generating a set of Doppler compensation parameters associated with the wireless node, the set of wireless devices, or a combination thereof based on receiving the one or more reference signals associated with the Doppler estimation procedure, and means for communicating with the wireless node, at least one wireless device of the set of wireless devices supported by the wireless node, or both based on the set of Doppler compensation parameters.

A non-transitory computer-readable medium storing code for wireless communications at a network entity is described. The code may include instructions executable by a processor to receive, from a wireless node, one or more reference signals associated with a Doppler estimation procedure for the wireless node, a set of wireless devices supported by the wireless node, or both, generate a set of Doppler compensation parameters associated with the wireless node, the set of wireless devices, or a combination thereof based on receiving the one or more reference signals associated with the Doppler estimation procedure, and communicate with the wireless node, at least one wireless device of the set of wireless devices supported by the wireless node, or both based on the set of Doppler compensation parameters.

Some examples of the method, apparatuses, and non-transitory computer-readable medium described herein may further include operations, features, means, or instructions for receiving, as part of the Doppler estimation procedure, the one or more reference signals using one or more beams and generating the set of Doppler compensation parameters based on receiving the one or more reference signals, where each beam of the one or more beams may be associated with a respective subset of Doppler compensation parameters of the one or more Doppler compensation parameters.

In some examples of the method, apparatuses, and non-transitory computer-readable medium described herein, communicating with the wireless node may include operations, features, means, or instructions for receiving a first message including aggregated control information from respective sets of control signals associated with the set of wireless devices.

Some examples of the method, apparatuses, and non-transitory computer-readable medium described herein may further include operations, features, means, or instructions for transmitting, to the wireless node, control signaling associated with the set of wireless devices based on receiving the aggregated control information and receiving, from the at least one wireless device of the set of wireless devices, a data message based on transmitting the control signaling.

In some examples of the method, apparatuses, and non-transitory computer-readable medium described herein, communicating with the wireless node may include operations, features, means, or instructions for receiving a first set of messages including aggregated control information associated with the set of wireless devices and a second set of messages including aggregated data associated with the set of wireless devices.

Some examples of the method, apparatuses, and non-transitory computer-readable medium described herein may further include operations, features, means, or instructions for transmitting, to the wireless node, control signaling associated with the set of wireless devices based on receiving the first set of messages and transmitting, to the wireless node, one or more feedback messages associated with the set of wireless devices based on receiving the second set of messages.

In some examples of the method, apparatuses, and non-transitory computer-readable medium described herein, communicating with the at least one wireless device of the set of wireless devices supported by the wireless node may include operations, features, means, or instructions for receiving, from the wireless node, a first message including control information associated with the at least one wireless device, transmitting, to the wireless node, control signaling for the at least one wireless device based on receiving the first message, and communicating one or more data messages with the at least one wireless device based on the control signaling.

In some examples of the method, apparatuses, and non-transitory computer-readable medium described herein, the wireless node may be a vehicle mounted IAB node.

Some examples of the method, apparatuses, and non-transitory computer-readable medium described herein may further include operations, features, means, or instructions for receiving a set of physical parameters, where the set of physical parameters include a location, a speed, and an angle between the wireless node and the network entity.

In some examples of the method, apparatuses, and non-transitory computer-readable medium described herein, the network entity includes one or more TRPs.

Some examples of the method, apparatuses, and non-transitory computer-readable medium described herein may further include operations, features, means, or instructions for receiving signaling indicating that the wireless node and the set of wireless devices may be operating in a speed environment that may be classified as a high-speed environment.

DETAILED DESCRIPTION

Figure 1:
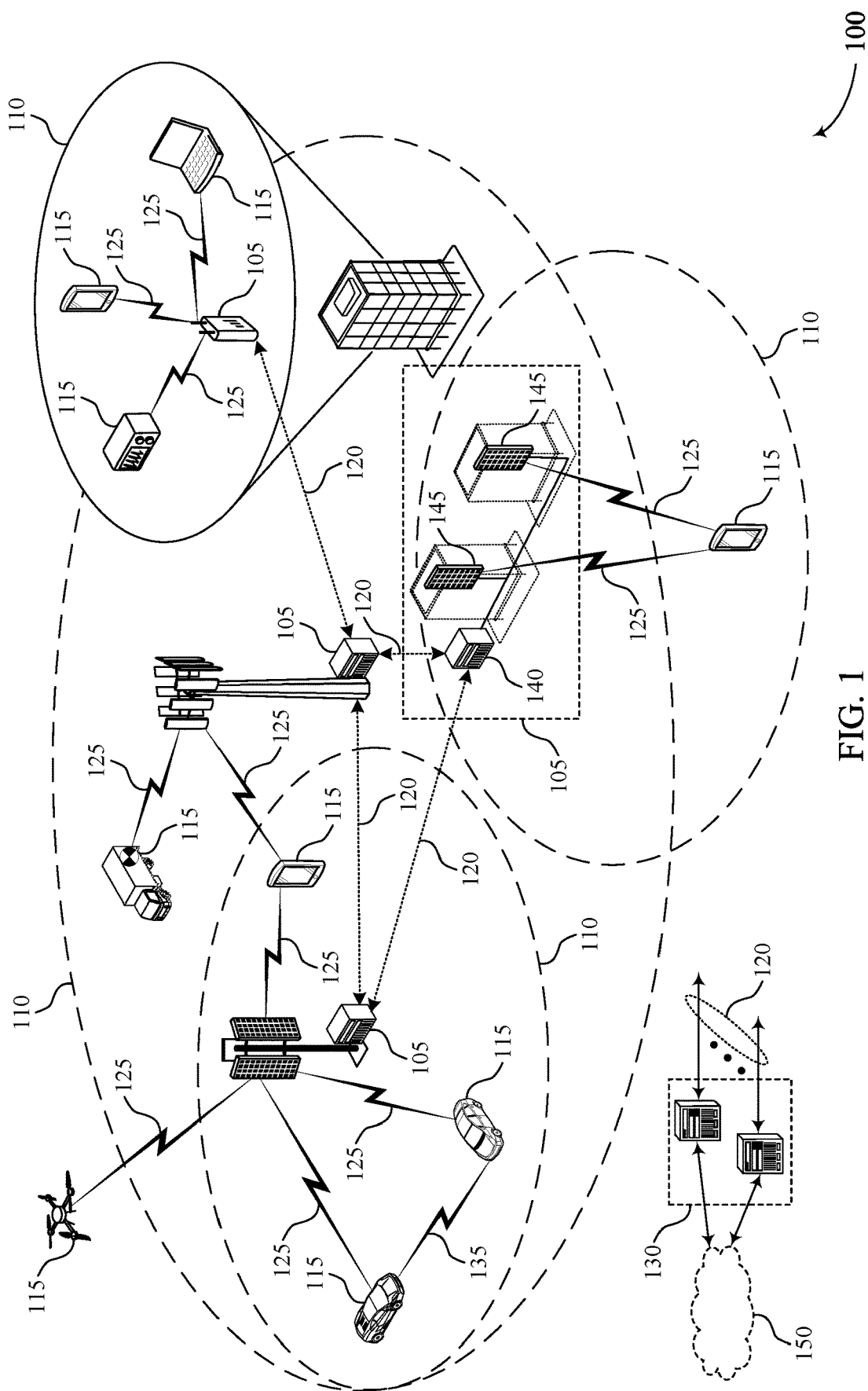
FIG. 1 illustrates an example of a wireless communications system that supports beam specific pre-compensation for wireless devices in a high speed single frequency network (SFN) in accordance with aspects of the present disclosure.

In some examples of wireless communications (e.g., a 5G network), wireless devices may operate in a high mobility environment such that the physical position changes rapidly relative to a normal mobility environment. For example, a user equipment (UE) may operate in a high-speed train (HST) environment (or other environment associated with a speed above a speed threshold (e.g., 300 kilometers per hour)). As such, the UE may experience rapid handover across multiple network entities, transmission reception points (TRPs), or beams as the position of the UE changes. In some examples, a wireless network may utilize a single-frequency-network (SFN) such that multiple network entities or TRPs may serve the UE via the same time-frequency resources to mitigate occurrences of latency during handover. Based on the high mobility characteristics of an HST, a UE may experience frequency Doppler shifting with each respective serving network entity for the set of time-frequency resources used in the SFN. In some examples, the UE may be able to generate and transmit one or more reference signals associated with a Doppler estimation procedure to each serving network entity which the network entities may be used to adjust the frequency resources to compensate for the speed and angle of UE. However, some UEs may be unable to generate these one or more reference signals, which may result in interference between beams from the multiple network entity causing limited or no service for such UEs in high speed environments.

A UE that may be unable to generate the one or more reference signals may benefit from the use of Doppler compensation factors by operating in accordance with the techniques described herein. For example, wireless communication for an HST may utilize a wireless node (such as a vehicle mounted integrated access and backhaul (IAB) node) which may be able to generate the one or more reference signals associated with the Doppler estimation procedure on behalf of one or more UEs located on the HST. In such examples, the wireless node may transmit the one or more reference signals directly to the serving network entities, which may be used while directly communicating with the one or more UEs. In some cases, the wireless node may act as a serving node for the one or more UEs. For example, the wireless node may receive control signaling from the UEs, aggregate the control signaling, and transmit the aggregated control signaling to the serving network entities. In such examples, the wireless node may assist in random access and handover for the multiple UEs while the multiple UEs transmit data directly to the serving network entities. In some examples, the wireless node may receive both control information and data from the multiple UEs. In such examples, the wireless node may aggregate control signaling and data separately and act as intermediate serving device between the serving network entities and the multiple UEs.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to beam specific pre-compensation for wireless devices in a high speed SFN.

FIG. 1 illustrates an example of a wireless communications system 100 that supports beam specific pre-compensation for wireless devices in a high speed SFN in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a geographic coverage area 110 over which the UEs 115 and the network entity 105 may establish one or more communication links 125. The geographic coverage area 110 may be an example of a geographic area over which a network entity 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example of UEs 115 are illustrated in FIG. 1. The UEs 115 described herein may be able to communicate with various types of devices, such as other UEs 115, the network entities 105, or network equipment (e.g., core network entities, relay devices, integrated access and backhaul (IAB) nodes, or other network equipment), as shown in FIG. 1.

In some examples, one or more components of the wireless communications system 100 may operate as or be referred to as a network entity. As used herein, a network entity may refer to any UE 115, network entity 105, entity of a core network 130, apparatus, device, or computing system configured to perform any techniques described herein. For example, a network entity may be a UE 115. As another example, a network entity may be a network entity 105. As another example, a first network entity may be configured to communicate with a second network entity or a third network entity. In one aspect of this example, the first network entity may be a UE 115, the second network entity may be a network entity 105, and the third network entity may be a UE 115. In another aspect of this example, the first network entity may be a UE 115, the second network entity may be a network entity 105, and the third network entity may be a network entity 105. In yet other aspects of this example, the first, second, and third network entities may be different. Similarly, reference to a UE 115, a network entity 105, an apparatus, a device, or a computing system may include disclosure of the UE 115, network entity 105, apparatus, device, or computing system being a network entity. For example, disclosure that a UE 115 is configured to receive information from a network entity 105 also discloses that a first network entity is configured to receive information from a second network entity. In this example, consistent with this disclosure, the first network entity may refer to a first UE 115, a first network entity 105, a first apparatus, a first device, or a first computing system configured to receive the information; and the second network entity may refer to a second UE 115, a second network entity 105, a second apparatus, a second device, or a second computing system.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples of wireless communications system 100 a UE 115 may operate in an HST environment. As such, the UE 115 may experience rapid handover across multiple network entities 105, TRPs, or beams as the position of the UE 115 changes. In some examples, a wireless network may utilize an SFN such that multiple network entities 105 or TRPs may serve the UE 115 via the same time-frequency resources to mitigate occurrences of latency during handover. Based on the high mobility characteristics of an HST, a UE 115 may experience frequency Doppler shifting with each respective serving network entity 105 for the set of time-frequency resources used in the SFN. In some examples, the UE 115 may be able to generate and transmit one or more reference signals associated with a Doppler estimation procedure to each serving network entity 105 which the network entities 105 may be used to adjust the frequency resources to compensate for the speed and angle of UE 115. However, some UEs 115 may be unable to generate these one or more reference signals, which may result in interference between beams from the multiple network entities 105 causing limited or no service for such UEs 115 in high speed environments.

In some cases, wireless communication for an HST may utilize a wireless node (e.g., a vehicle mounted IAB node) which may be able to generate the one or more reference signals associated with the Doppler estimation procedure on behalf of one or more UEs 115 located on the HST. In such examples, the wireless node may transmit the one or more reference signals directly to the serving network entities 105, which may be used while directly communicating with the one or more UEs 115. In some cases, the wireless node may act as a serving node for the one or more UEs 115. For example, the wireless node may receive control signaling from the UEs 115, aggregate the control signaling, and transmit the aggregated control signaling to the serving network entities 105. In such examples, the wireless node may assist in random access and handover for the multiple UEs 115 while the multiple UEs 115 transmit data directly to the serving network entities 105. In some examples, the wireless node may receive both control information and data from the multiple UEs 115. In such examples, the wireless node may aggregate control signaling and data separately and act as intermediate serving device between the serving network entities 105 and the multiple UEs 115.

Figure 2:
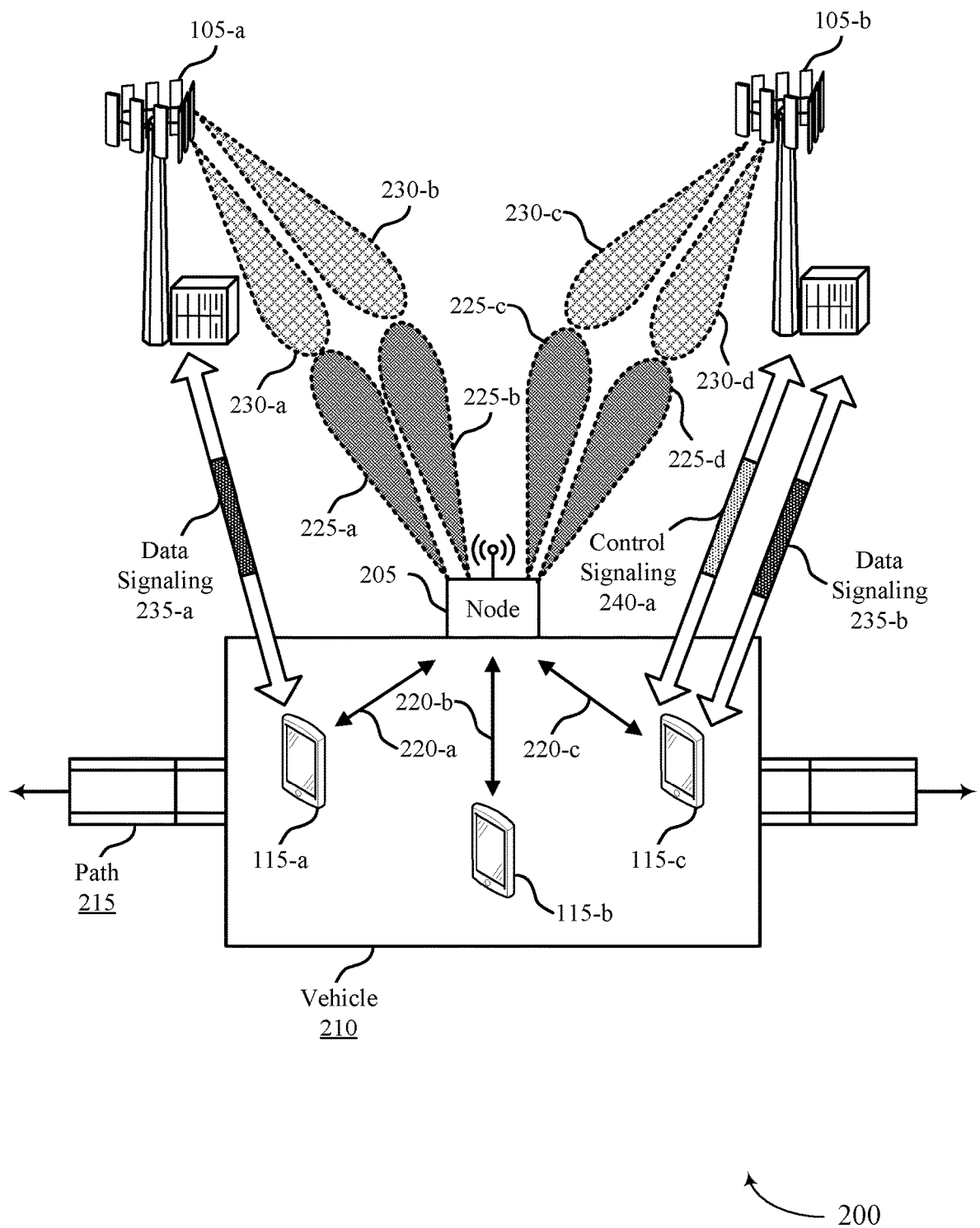
FIG. 2 illustrates an example of a wireless communications system that supports beam specific pre-compensation for wireless devices in a high speed SFN in accordance with aspects of the present disclosure.

FIG. 2 illustrates an example of a wireless communications system 200 that supports beam specific pre-compensation for wireless devices in a high speed SFN in accordance with aspects of the present disclosure. In some examples, wireless communications system 200 may implement one or more aspects of wireless communications system 100. For instance, UEs 115-a through 115-c may be examples of UEs 115, the network entities 105-a and 105-b may be examples of network entities 105, and the node 205 may be an example of an IAB node, a network entity 105, or a UE 115 as described with reference to FIG. 1.

In some examples of wireless communications system 200, the node 205 may be located within (e.g., coupled with) a vehicle 210. The vehicle 210 may be an example of for instance, an HST. The vehicle 210 may, additionally or alternatively, be an example of a train, a tram, a car, a truck, a motorcycle, a boat, a plane, or the like. In some examples, the vehicle 210 may move along a path 215. If the vehicle 210 is an HST or a train, the path 215 may be an example of a set of tracks (e.g., railroad tracks) along which the vehicle 210 moves. In some examples, the vehicle 210 may also host the UEs 115-a through 115-c such that each of the UEs 115 may be associated with the node 205.

In some examples, wireless communications system 200 may illustrate an example of SFN operation for the vehicle 210, such as an HST. For example, based on the mobility of an HST, a given wireless device of the network (e.g., the node 205 or the UEs 115) may utilize SFN techniques. Implementing an SFN may involve using multiple network entities 105 to perform communications where the given wireless device may transmit the same data to multiple network entities 105 or TRPs on a same frequency or time resource. The use of SFN may reduce latency for hand over for the wireless devices across the multiple network entities 105 or the multiple TRPs. In some examples, HST-SFN techniques may be implemented for both FR1 (e.g., frequency bands in a sub-6 GHz spectrum) and FR2 (e.g., frequency bands in a mmWave spectrum).

In some examples, the wireless devices associated with the vehicle 210 may utilize one or more beams to communicate with one or more network entities 105. For example, as illustrated in FIG. 2, individual network entity beams 230 (e.g., network entity beams 230-a through 230-d) may correspond to individual node beams 225 (e.g., node beams 225-a, 225-b, 225-c, and 225-d respectively) for wireless communications. In some examples, the wireless communications illustrated in FIG. 2 may include downlink transmissions to the node 205, in which the network entity beams 230 may be transmission beams and the node beams 225 may be reception beams. Additionally or alternatively, the wireless communications illustrated in FIG. 2 may include uplink transmissions from the node 205, in which the network entity beams 230 may be reception beams and the node beams 225 may be transmission beams.

In some cases, wireless devices associated with an HST may experience one or more HST channel characteristics. For example, while traveling at a speed above a threshold amount, Doppler spread (e.g., a measure of a change of bandwidth in a signal at a receiver as compared to a transmitter) or Doppler shift (e.g., a measure of a change of frequency in a signal at a receiver as compared to a transmitter) may change the frequency or time resources associated with a given transmission. For instance, communications from or to network entity beam 230-a when the node 205 is moving away from the network entity 105-a (e.g., when a displacement of node 205 relative to network entity 105-a is increasing) may be associated with a Doppler shift of $-f_{D_1}$. Additionally or alternatively, communications from or to the network entity beam 230-c when the node 205 is moving toward the network entity 105-b (e.g., when a displacement of node 205 relative to network entity 105-b is decreasing) may be associated with a Doppler shift of $f_{D_2}$. If the network entities 105-a and 105-b both transmit respective signaling with a center frequency $f_c$, then the node 205 may receive the respective signaling from network entity 105-a with center frequency $f_c-f_{D_1}$ and may receive the respective signaling from the network entity 105-b with center frequency $f_c+f_{D_2}$. As such, the network entity beam 230-a and the network entity beam 230-c may interfere with each other based on the respective frequency shifts.

As such, the network entities 105-a and 105-b may perform a frequency pre-compensation on a transmission intended for a wireless device moving at a speed above the threshold. Performing pre-compensation may include adjusting a center frequency of a signal to account for Doppler shift or spread. For instance, a wireless device may transmit one or more reference signals associated with a Doppler estimation procedure to the network entities 105-a and 105-b. In some examples, the network entities 105-a and 105-b may use the one or more received reference signals to determine a pre-compensation value associated with a given network entity beam 230 when communicating with the wireless device. In some cases, however, one or more wireless devices associated with the vehicle 210 (e.g., the UEs 115 on vehicle 210) may be examples of wireless devices not configured to transmit the one or more reference signals associated with the Doppler estimation procedure. As such, these wireless devices may experience interference due to Doppler spread or shift.

According to the techniques described herein, the wireless communications system 200 may mitigate or reduce the effects of Doppler by using an intermediary device (e.g., the node 205) that supports Doppler estimation signaling. For example, the node 205 may communicate with the network entities 105 on behalf of UEs 115 that may be unable to transmit the one or more reference signals associated with the Doppler estimation procedure.

In some implementations, the node 205, the UEs 115, and the network entities 105 may operate in accordance with an indirect communication operation. For example, the node 205 may establish respective communication links 220 with each of the UEs 115. In some examples, the communication links 220 may be examples of sidelink. Based on the relative speed between the node 205 and the UEs 115, the communication links 220 may be used without Doppler pre-compensation. The node 205 may also transmit, on behalf of the UEs 115, one or more reference signals to each of the network entities 105 for use in Doppler estimation. In some examples, a Doppler pre-compensation factor may be beam specific. For example, the network entities 105 may receive the one or more reference signals using respective network entity beams 230 (e.g., the network entity 105-a may use network entity beams 230-a and 230-b and the network entity 105-b may use the network entity beams 230-c and 230-d) and may generate a specific Doppler pre-compensation factor for each network entity beam 230.

In some examples, the node 205 may also transmit control information on behalf of the UEs 115. For example, the UEs 115 may communicate data information directly with the network entities 105, but the UEs 115 may transmit configuration parameters (e.g., control information associated with a control plane) to the node 205 using the respective communication links 220. As such, the node 205 may serve as a signal aggregator that may aggregate signals from each of the UEs 115 to reduce signaling overhead for the wireless communications system 200. For example, as illustrated in FIG. 2, the UE 115-a may transmit control signaling to the node 205 using communication link 220-a. In such examples, the node 205 may aggregate the control signaling received from the UE 115-a with control signaling received from the other UEs 115. As such, the UE 115-a may establish service with the network entity 105-a, based on transmitting control signaling to the node 205, and communicated data signaling 235-*a* directly with the network entity 105-*a*.

In some examples, the node 205 may transmit both control information and data information on behalf of the UEs 115. For example, the UEs 115 may transmit configuration parameters (e.g., control information associated with a control plane) and data information (e.g., data associated with a user plane) to the node 205 using the respective communication links 220. As such, the node 205 may serve as a signal aggregator that may aggregate the control information from each of the UEs 115 into a first message and aggregate data information from each of the UEs 115 into a second message to reduce signaling overhead for the wireless communications system 200. The node 205 may transmit the first and second messages to the network entities 105 using the node beams 225. For example, as illustrated in FIG. 2, the UE 115-*b* may transmit both control information and data information to the node 205 using communication link 220-*b*. As such, the node 205 may transmit, to the network entities 105, both control information and data information on behalf of the UE 115-*b* using the aggregation techniques described herein.

In some cases, UEs 115 capable of transmitting one or more reference signals associated with a Doppler estimation procedure may also be served by the node 205 in cases where doing so increases channel condition, loading condition, or both. As such, the node 205 may use the same radio resource allocation for serving UEs 115 capable of transmitting the one or more reference signals and for serving UEs 115 not capable of transmitting the one or more reference signals. In some examples, the node 205 may be an example of a UE 115 capable of transmitting the one or more reference signals associated with a Doppler estimation procedure.

In some implementations, the node 205, the UEs 115, and the network entities 105 may operate in accordance with a direct communication operation. For example, the network entities 105 may apply pre-compensation to each network entity beam 230 by default without receiving signaling from the UEs 115. In such examples, the network entities 105 may configure a frequency carrier dedicated to SFN for communications with UEs 115 not configured to transmit the one or more reference signals associated with the Doppler estimation procedure. In some examples, a default pre-compensation may be beam specific (e.g., each network entity beam 230 has a respective default pre-compensation). The network entities 105 may determine the default pre-compensation for each respective network entity beam 230 based on the relative speed and angle of travel of the vehicle 210. For instance, with reference to wireless communications in accordance with FR2, each network entity beam 230 may be narrow in the angular domain relative to network entity beams 230 used in accordance with FR1, so it may be advantageous for the network entities 105 to apply a pre-compensation by default for each network entity beam 230. In some cases, the angle between each beam and the vehicle 210 may be measured by the network entities 105, the node 205, or the UEs 115. In some cases, information about the vehicle 210 speed may be determined by the network entities 105 based on coordination between a mobile operator and a vehicle 210 operator.

In some examples, knowledge pertaining to location and angle of the vehicle 210 may be obtained by the node 205. As such, the node 205 may send relevant information pertaining to the physical orientation of the vehicle 210 to the network entities 105. Based on receiving the physical orientation information, the network entities 105 may determine the Doppler shift/spread associated with each network entity beam 230 and further determine a default pre-compensation for each network entity beam 230. In some cases, one or more wireless devices (not illustrated in FIG. 2) may be within the coverage area of the one or more network entities 105 in communication with the vehicle 210, but may not be associated with the vehicle 210. In some cases, these wireless devices may still receive service using the network entity beams 230 with default pre-compensation. For example, these wireless devices may use configured frequency tracking loops that may overcome the frequency offset associated with pre-compensation.

Based on the wireless devices operating in accordance with the direct communication operation, the UEs 115 on the vehicle 210 may be unaware of (e.g., blind to) the default pre-compensation. For example, as illustrated in FIG. 2, the UE 115-*c* may communicate both control signaling 240-*a* and data signaling 235-*b* directly with network entity 105-*b* while being blind to pre-compensation. The control signaling 240-*a* and the data signaling 235-*b* may be communicated using beams with default pre-compensation factors where the pre-compensation factors are determined by the network entities 105 based on one or more reference signals associated with the Doppler estimation procedure. In some examples, the UE 115-*c* may also communicate with node 205 via communication link 220-*c*.

As such, UEs 115 not configured to transmit one or more reference signals associated with the Doppler estimation procedure may communicate with the network entities 105 via HST-SFN techniques by operating in accordance with the direct communication operation, the indirect communication operation, or a combination thereof, as described herein.

Figure 3:
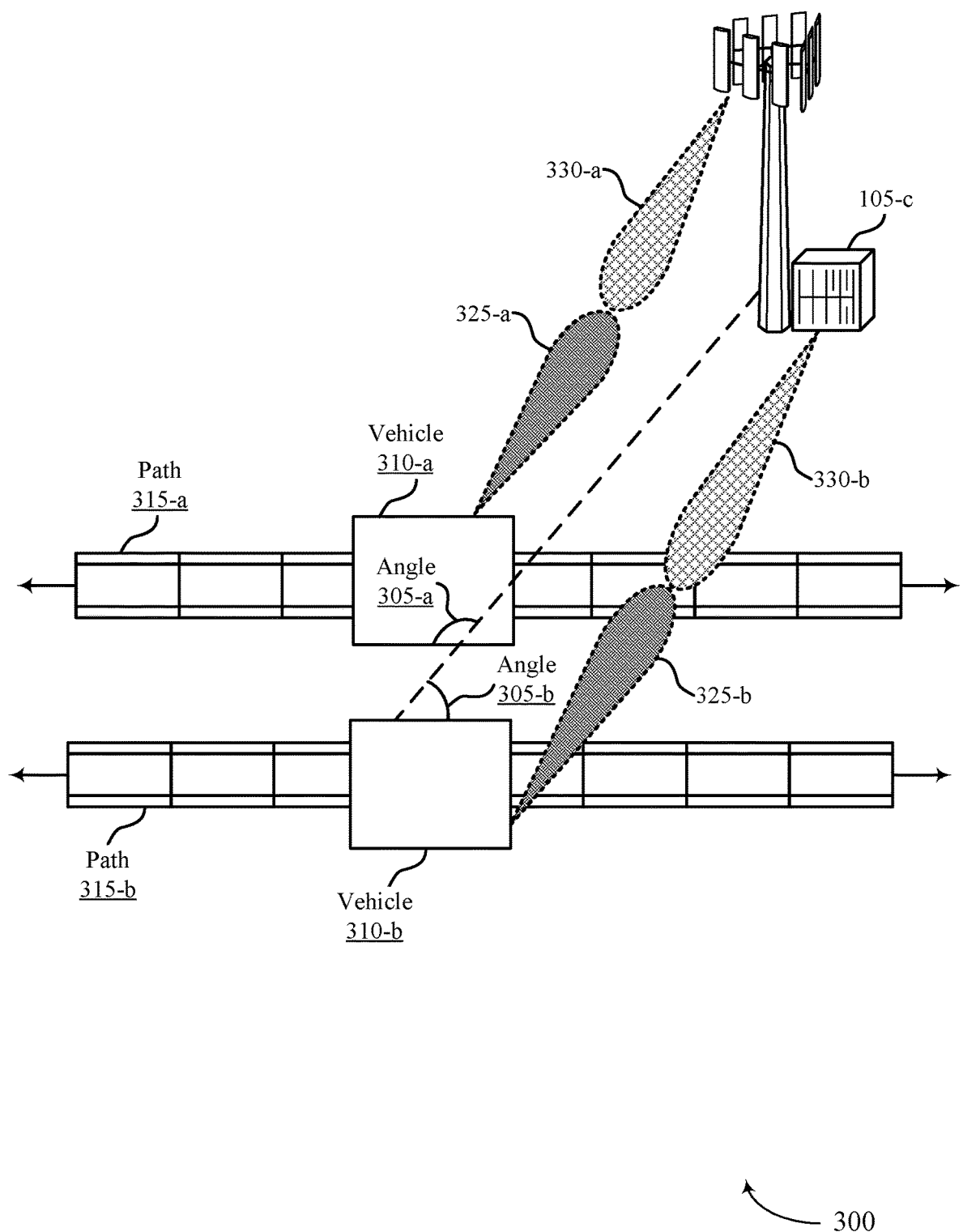
FIG. 3 illustrates an example of a wireless communications system that supports beam specific pre-compensation for wireless devices in a high speed SFN in accordance with aspects of the present disclosure.

FIG. 3 illustrates an example of a wireless communications system 300 that supports beam specific pre-compensation for wireless devices in a high speed SFN in accordance with aspects of the present disclosure. In some examples, wireless communications system 300 may implement one or more aspects of wireless communications system 100, wireless communications system 200, or both. For instance, the network entity 105-*c* may be an example of a network entity 105 as described with reference to FIG. 1. Additionally or alternatively, vehicles 310-*a* and 310-*b* may be examples of a vehicle 210, paths 315-*a* and 315-*b* may be examples of a path 215, node beams 325-*a* and 325-*b* may be examples of node beams 225, and network entity beams 330-*a* and 330-*b* may be examples of network entity beams 230 as described with reference to FIG. 2.

In some examples, the vehicle 310-*a* and the vehicle 310-*b* may travel in opposite directions on their respective paths 315. For examples, the vehicle 310-*a* may be traveling in a direction away from the network entity 105-*c* and the vehicle 310-*b* may be traveling in a direction towards the network entity 105-*c*. As such, the network entity beam 330-*a* communicating with the vehicle 310-*a* and the network entity beam 330-*b* communicating with the vehicle 310-*b* may be associated with different Doppler shifts (Δf). For example, assuming network entity beam 330-*a* and 330-*b* are both operating at a center frequency of $f_c$, angle 305-*b* is equal to θ, angle 305-*a* is equal θ-π, each vehicle 310 is traveling at a speed of $v_0$, and the speed of light is c, the network entity beam 330-*a* may experience $$\Delta f = -\frac{f_c v_0 \cos(\theta)}{c}$$

and the network entity beam 330-b may experience $$\Delta f = \frac{f_c v_0 \cos(\theta)}{c}.$$

The network entity 105-c may account for Doppler shift associated with each network entity beam 330 by operating in accordance with the techniques described herein. For example, the network entity 105-a may transmit on two component carriers with two network entity beams 330 pointed in a same direction, where each network entity beam 330 may serve a different direction of travel. For example, the network entity beam 330-a may service vehicles 310 moving away from the network entity 105 (e.g., the vehicle 310-a) using a default pre-compensation value calculated based on the speed of vehicle 310-a and the network entity beam 330-b may service vehicles moving towards the network entity 105 (e.g., the vehicle 310-b) using a default pre-compensation value calculated based on the speed of vehicle 310-b. In some examples, the component carrier, directionality, and pre-compensation associated with each network entity beam 330 may be determined using network planning. Additionally or alternatively, the network entity 105-c may select different sub-carriers to serve vehicles 310 traveling in opposite directions (e.g., a first sub-carrier to service vehicle 310-a and a second sub-carrier to service vehicle 310-b). Additionally or alternatively, the network entity 105 may select different times to serve vehicles traveling in opposite directions (e.g., a first time to service vehicle 310-a and a second time to service vehicle 310-b).

In some cases, the vehicles 310 may be equipped with respective nodes (such as the node 205 with reference to FIG. 2) which may send one or more sounding reference signals (SRSs) to the network entity 105-c. In some examples, the network entity 105-c may use the one or more SRSs to measure a frequency offset for each network entity beam 330 and may determine a respective pre-compensation for each network entity beam 330 that may be used in communication with all wireless devices within the geographic coverage area of the network entity 105-c.

In some cases, the network entity 105-c may adjust pre-compensation for a given network entity beam 330 based on communication with one or more wireless devices associated with a vehicle 310. For example, a wireless device may be configured to generate one or more reference signals associated with a Doppler estimation procedure and may transmit the one or more reference signals to the network entity 105-c. As such, the network entity 105-c may adjust the pre-compensation for one or more network entity beams 330 based on receiving the one or more reference signals. In some examples, the network entity 105-c may assume to use the same pre-compensation for communication with other wireless devices on the vehicle 310. In some examples, the wireless device transmitting the one or more reference signals may be an example of the node equipped to the vehicle 310 or a UE 115 associated with the vehicle 310.

In some cases, the network entity 105-c may adjust pre-compensation for one or more network entity beams 330 based on uplink signals received at the network entity 105-c. For example, the network entity may receive from one or more wireless devices one or more SRSs, one or more feedback messages (e.g., acknowledgment (ACK) or non-ACK (NACK) feedback), among other types of uplink traffic. In some examples, the network entity 105-c may not be a designated timing or frequency reference for a given wireless device. As such the network entity 105-c may request from one or more neighboring network entities 105 (not illustrated in FIG. 3) acting as the timing or frequency reference for the given wireless device for a pre-compensation to use in communication with the given wireless device. Multi-network entity 105 communication may be achieved using backhaul messaging and network coordination among the multiple network entities 105.

Figure 4:
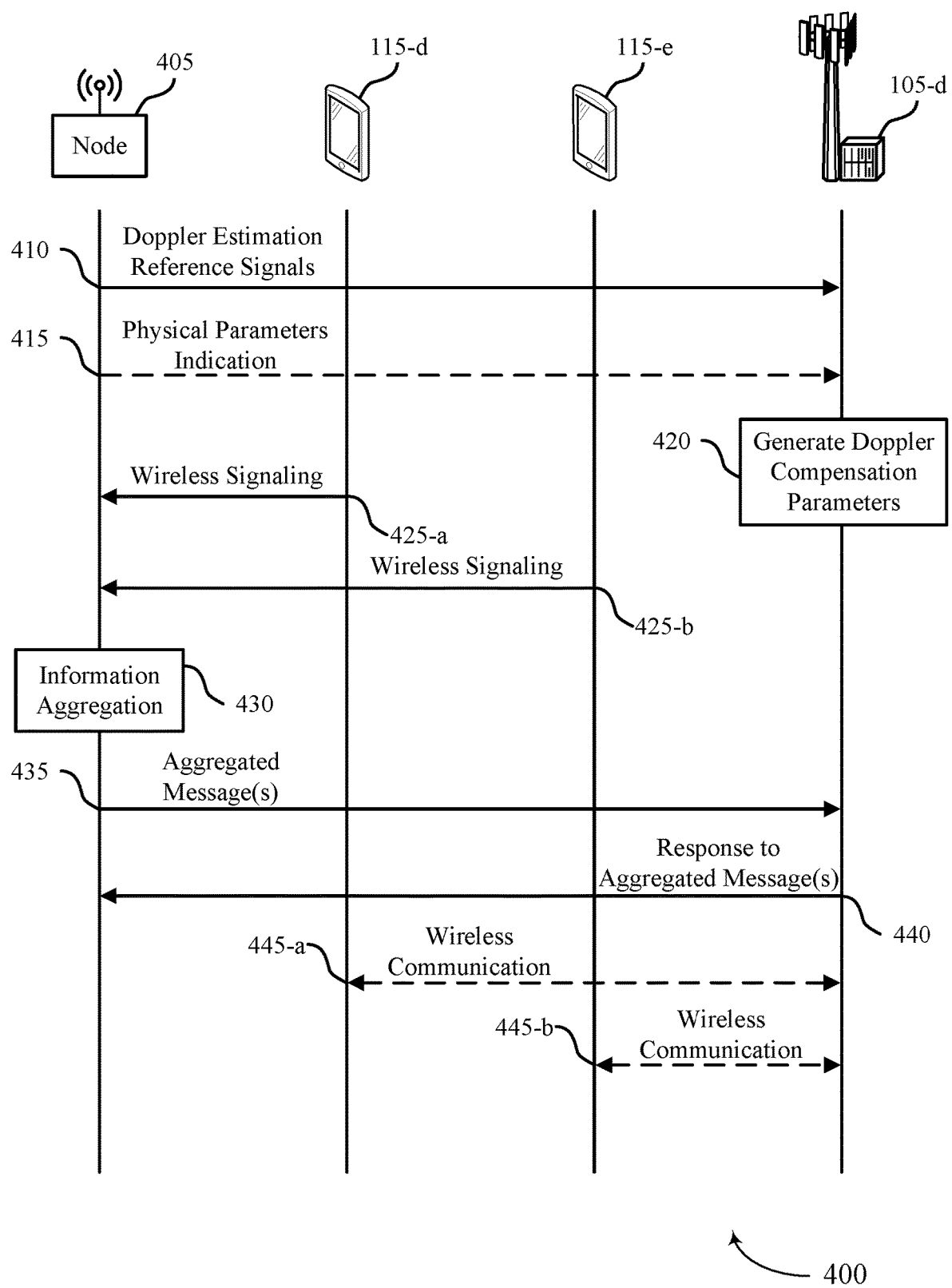
FIG. 4 illustrates an example of a process flow that supports beam specific pre-compensation for wireless devices in a high speed SFN in accordance with aspects of the present disclosure.

FIG. 4 illustrates an example of a process flow 400 that supports beam specific pre-compensation for wireless devices in a high speed SFN in accordance with aspects of the present disclosure. In some examples, process flow 400 may implement aspects of wireless communications system 100, wireless communications system 200, wireless communications system 300, or a combination thereof. Process flow 400 includes a node 405 which may be an example of node 205, UEs 115-d and 115-e which may be examples of UEs 115, and a network entity 105-d which may be an example of a network entity 105 as described with reference to FIGS. 1 through 3. In some examples, the node 405 may be an example of a vehicle mounted IAB node and the network entity 105-d may include one or more TRPs. Alternative examples of the following may be implemented, where some steps are performed in a different order than described or are not performed at all. In some cases, steps may include additional features not mentioned below, or further steps may be added. In addition, while process flow 400 shows processes between a node 405, two UEs 115, and a network entity 105-d, it should be understood that these processes may occur between any number of network devices.

At 410, the node 405 may transmit to the network entity 105-d Doppler estimation reference signals. For example, the node 405 may transmit one or more reference signals to the network entity 105-d, where the one or more reference signals may be associated with a Doppler estimation procedure for the node 405, for a set of wireless devices supported by node 405 (e.g., UE 115-d and 115-e), or for both. In some examples, the node 405 may transmit as part of the Doppler estimation procedure, one or more Doppler compensation parameters associated with the node 405, one or more wireless devices of the set of wireless devices, or a combination thereof. In some examples, the node 405 may transmit as part of the Doppler estimation procedure, the one or more reference signals using one or more beams, where each beam of the one or more beams is associated with a respective subset of Doppler compensation parameters of a set of one or more Doppler compensation parameters.

At 415, the node 405 may transmit to the network entity 105-d, a set of physical parameters, where the set of physical parameters includes a location, a speed, and an angle between the node 405 and the network entity 105-d. In some examples, the physical parameters may also include signaling indicating that the node 405 and the set of wireless devices are operating in a speed environment that is classified as a high-speed environment. In some examples, the physical parameters may be included in the one or more reference signal transmitted at 410 or may be transmitted in a separate message.

At 420, the network entity 105-d may generate a set of Doppler compensation parameters associated with the node 405, the set of wireless devices, or a combination thereof based on receiving the one or more reference signals associated with the Doppler estimation procedure. In some examples, the network entity 105-d may receive, as part of the Doppler estimation procedure, the one or more reference signals using one or more beams. As such, the network entity 105-d may generate the Doppler compensation parameters such that each beam of the one or more beams is associated with a respective subset of Doppler compensation parameters of the one or more Doppler compensation parameters.

At 425-a and 425-b, the node 405 may receive a first signal from the UE 115-d and a second signal from the UE 115-e. In some examples, the UE 1151-d and the UE 115-e may be in a first communication mode, a second communication mode, or a combination thereof. For example, the network entity 105-d may receive from the UE 115-d and the UE 115-e respective sets of control signals based on the UE 115-d and the UE 115-e operating in accordance with the first communication mode. Additionally or alternatively, the network entity 105-d may receive from the UE 115-d and the UE 115-e respective sets of signals including control information and data based on the UE 115-d and the UE 115-e operating in accordance with the second communication mode. In some examples, the node 405 may communicate with the UE 115-d and the UE 115-e via sidelink. In some examples, the node 405 may communicate with a given wireless device of the set of wireless devices based on a channel condition between the node 405 and the given wireless device being above a channel condition threshold, a loading condition between the node 405 and the given wireless device being above a loading condition threshold, or both.

In some cases, one or more of the UEs 115 may be able to generate and transmit the one or more reference signals associated with the Doppler estimation procedure to each serving network entity 105. As such, these one or more UEs 115 may communicate with each serving network entity 105 in accordance with a first operation mode, in which the UEs 115 may directly utilize one or more multi-TRP features described herein. In some cases, one or more of the UEs 115 may be unable to generate the one or more reference signals associated with the Doppler estimation procedure. As such, these one or more UEs 115 may operate in accordance with a second operation mode, in which the UEs 115 may refrain from directly using one or more multi-TRP features described herein. In some examples, the UEs 115 may utilize the one or more multi-TRP features indirectly via service of the node 405.

At 430, the node 405 may aggregate information from the first signal and the second signal based on receiving the first signal from the UE 115-d and receiving the second signal from the UE 115-e.

At 435, the node 405 may transmit to the network entity 105-d, a message including the aggregated information from the first signal and the second signal based on the Doppler estimation procedure being for the node 405, for the set of wireless devices supported by the node 405, or for both. For example, if the UE 115-d or the UE 115-e are operating in accordance with the first communication mode, the message may include aggregated control information from the respective sets of control signals transmitted by the UE 115-d and the UE 115-e. Additionally or alternatively, if the UE 115-d or the UE 115-e are operating in accordance with the second communication mode, the message may include a first set of messages including aggregated control information from the UE 115-d and the UE 115-e and a second set of messages including aggregated data from the UE 115-d and the UE 115-e.

At 440, the network entity 105-d may transmit to the node 405 a response to the aggregated messages. For example, if the UE 115-d or the UE 115-e are operating in accordance with the first communication mode, the network entity 105-d may transmit, to the node 405, control signaling associated with UE 115-d or the UE 115-e based on receiving the aggregated control information. If the UE 115-d or the UE 115-e are operating in accordance with the second communication mode, the network entity 105-d may transmit, to the node 405, control signaling associated with the UE 115-d or the UE 115-e based on receiving the first set of messages and one or more feedback messages associated with the UE 115-d or the UE 115-e based on receiving the second set of messages.

At 445-a and 445-b, the UEs 115 and the network entity 105-d may communicate based on the Doppler compensation parameters. For example, if the if the UE 115-d or the UE 115-e are operating in accordance with the first communication mode, the network entity 105-d may receive from the UE 115-d or the UE 115-e one or more respective data messages based on the network entity 105-d transmitting control signaling to the node 405 at 440. As such, the network entity 105-d may transmit in response to the one or more respective data messages, one or more feedback messages associated with the one or more respective data messages. If the UE 115-d or the UE 115-e are operating in accordance with the second communication mode, the UE 115-d or the UE 115-e may receive control signaling and feedback messaged transmitted by the network entity 105-d from the node 405, where the node 405 may act as an intermediary wireless device between the UEs 115 and the network entity 105-d.

Figure 5:
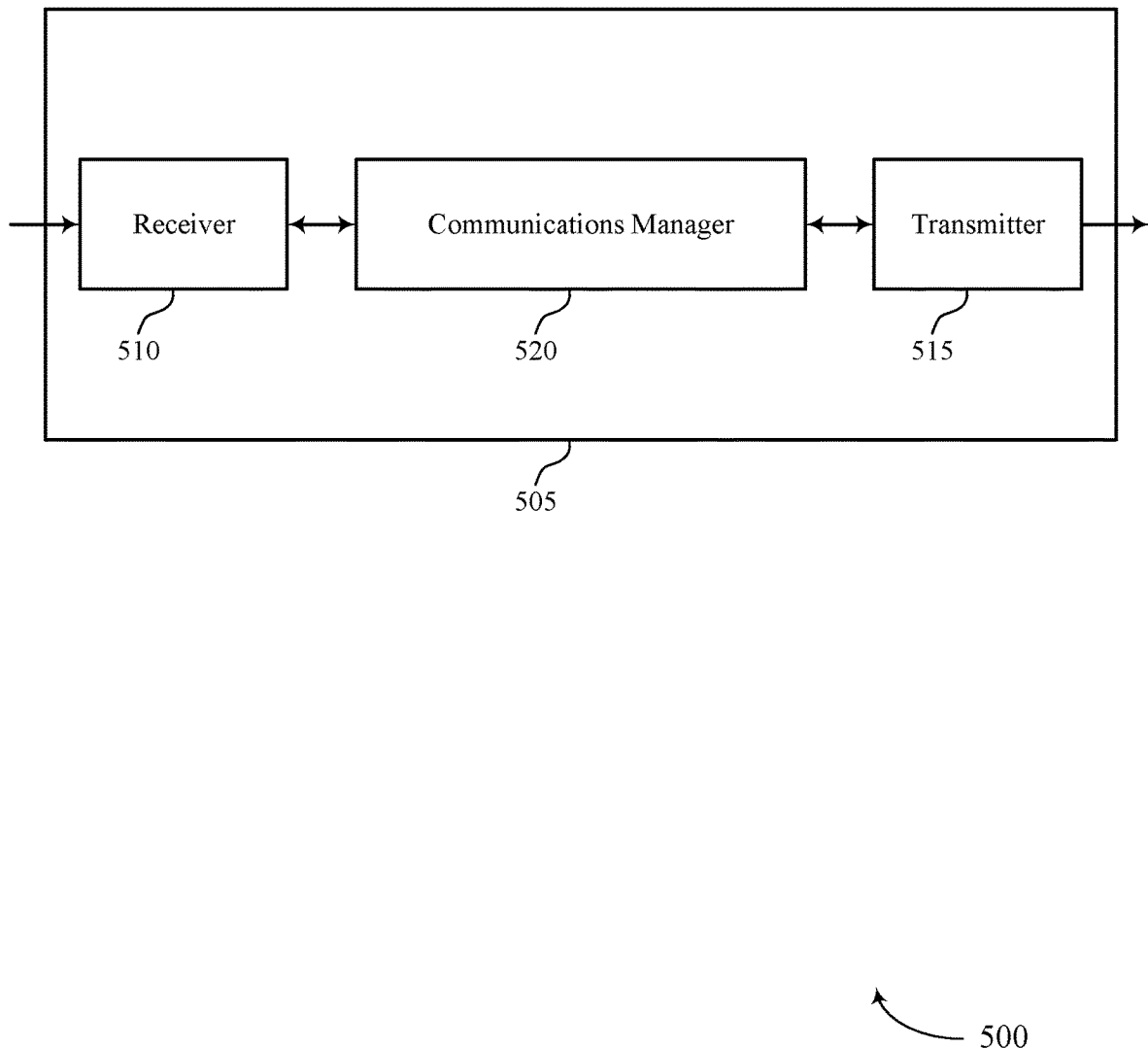
FIGS. 5 and 6 show block diagrams of devices that support beam specific pre-compensation for wireless devices in a high speed SFN in accordance with aspects of the present disclosure.

FIG. 5 shows a block diagram 500 of a device 505 that supports beam specific pre-compensation for wireless devices in a high speed SFN in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam specific pre-compensation for wireless devices in a high speed SFN). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam specific pre-compensation for wireless devices in a high speed SFN). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of beam specific pre-compensation for wireless devices in a high speed SFN as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a wireless node in accordance with examples as disclosed herein. For example, the communications manager 520 may be configured as or otherwise support a means for transmitting one or more reference signals to one or more network entities, the one or more reference signals associated with a Doppler estimation procedure for the wireless node, for a set of wireless devices supported by the wireless node, or for both. The communications manager 520 may be configured as or otherwise support a means for receiving a first signal from a first device of the set of wireless devices supported by the wireless node. The communications manager 520 may be configured as or otherwise support a means for receiving a second signal from a second device of the set of wireless devices supported by the wireless node. The communications manager 520 may be configured as or otherwise support a means for aggregating information from the first signal and the second signal based on receiving the first signal from the first device and receiving the second signal from the second device. The communications manager 520 may be configured as or otherwise support a means for transmitting, to the one or more network entities, a message including the aggregated information from the first signal and the second signal based on the Doppler estimation procedure being for the wireless node, for the set of wireless devices supported by the wireless node, or for both.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for signal aggregation from of signals from multiple wireless devices which may result in reduced processing, reduced power consumption, more efficient utilization of communication resources for the wireless network.

Figure 6:
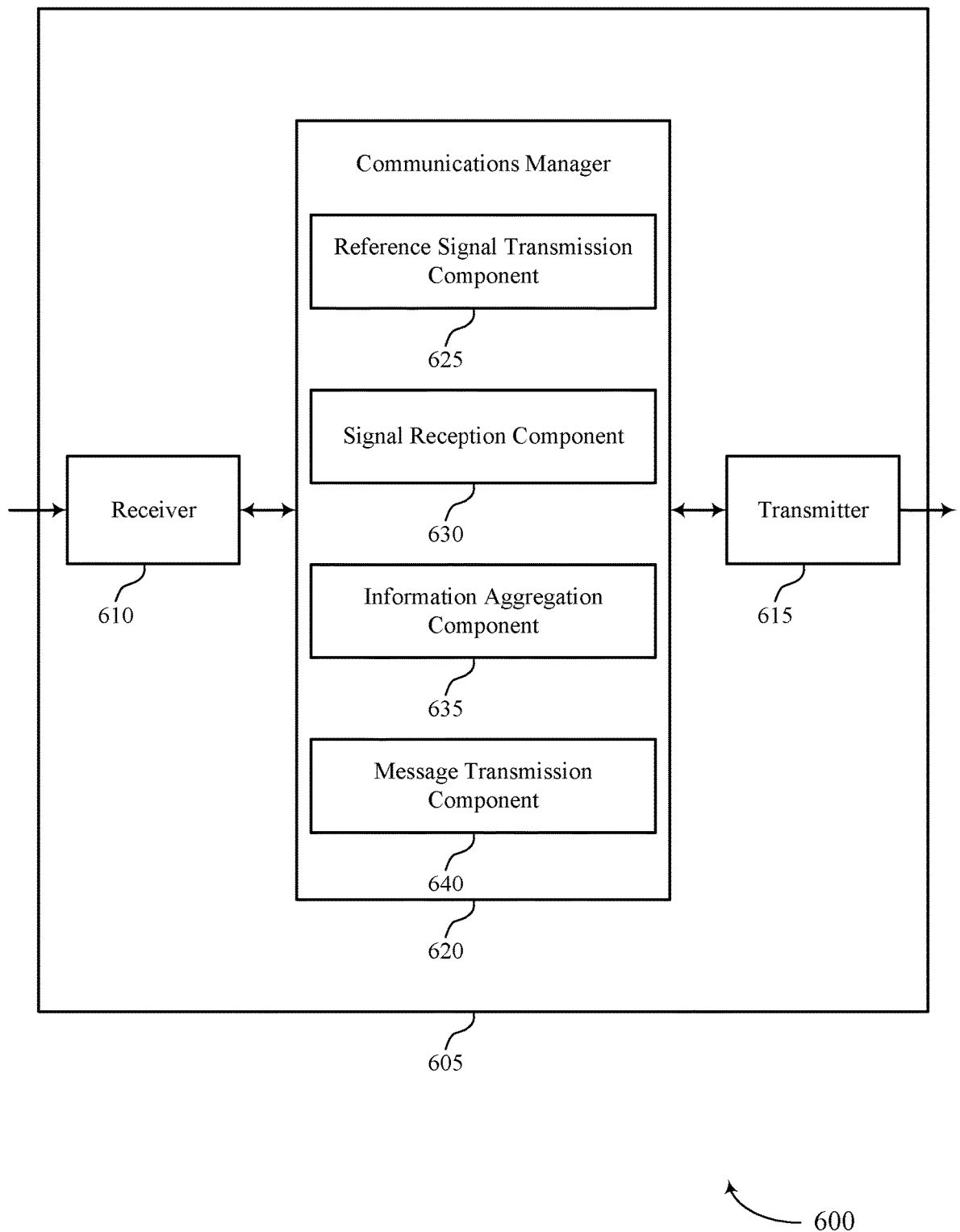

FIG. 6 shows a block diagram 600 of a device 605 that supports beam specific pre-compensation for wireless devices in a high speed SFN in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam specific pre-compensation for wireless devices in a high speed SFN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam specific pre-compensation for wireless devices in a high speed SFN). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of beam specific pre-compensation for wireless devices in a high speed SFN as described herein. For example, the communications manager 620 may include a reference signal transmission component 625, a signal reception component 630, an information aggregation component 635, a message transmission component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a wireless node in accordance with examples as disclosed herein. The reference signal transmission component 625 may be configured as or otherwise support a means for transmitting one or more reference signals to one or more network entities, the one or more reference signals associated with a Doppler estimation procedure for the wireless node, for a set of wireless devices supported by the wireless node, or for both. The signal reception component 630 may be configured as or otherwise support a means for receiving a first signal from a first device of the set of wireless devices supported by the wireless node. The signal reception component 630 may be configured as or otherwise support a means for receiving a second signal from a second device of the set of wireless devices supported by the wireless node. The information aggregation component 635 may be configured as or otherwise support a means for aggregating information from the first signal and the second signal based on receiving the first signal from the first device and receiving the second signal from the second device. The message transmission component 640 may be configured as or otherwise support a means for transmitting, to the one or more network entities, a message including the aggregated information from the first signal and the second signal based on the Doppler estimation procedure being for the wireless node, for the set of wireless devices supported by the wireless node, or for both.

Figure 7:
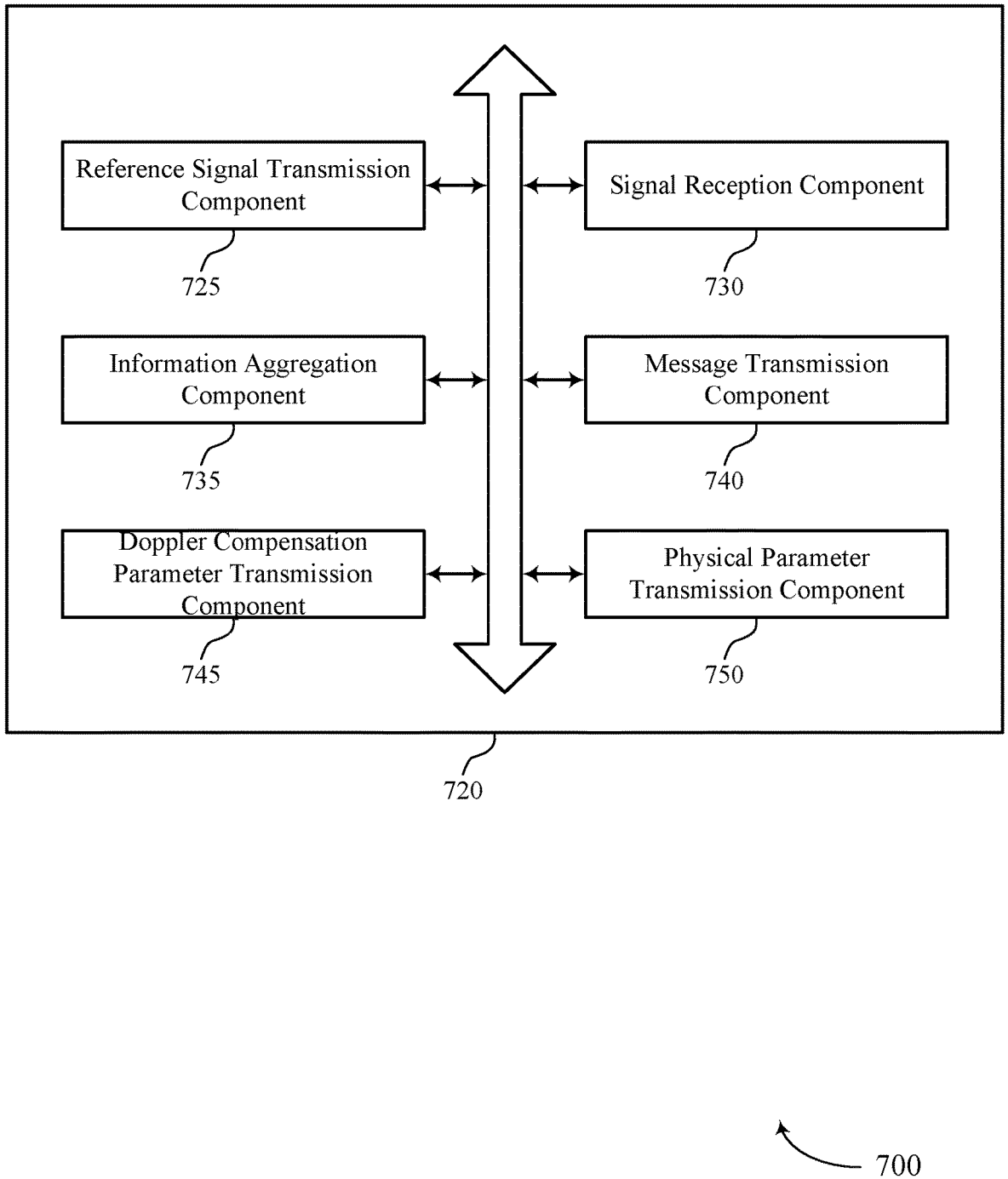
FIG. 7 shows a block diagram of a communications manager that supports beam specific pre-compensation for wireless devices in a high speed SFN in accordance with aspects of the present disclosure.

FIG. 7 shows a block diagram 700 of a communications manager 720 that supports beam specific pre-compensation for wireless devices in a high speed SFN in accordance with aspects of the present disclosure. The communications manager 720 may be an example of aspects of a communications manager 520, a communications manager 620, or both, as described herein. The communications manager 720, or various components thereof, may be an example of means for performing various aspects of beam specific pre-compensation for wireless devices in a high speed SFN as described herein. For example, the communications manager 720 may include a reference signal transmission component 725, a signal reception component 730, an information aggregation component 735, a message transmission component 740, a Doppler compensation parameter transmission component 745, a physical parameter transmission component 750, or any combination thereof. Each of these components may communicate, directly or indirectly, with one another (e.g., via one or more buses).

The communications manager 720 may support wireless communications at a wireless node in accordance with examples as disclosed herein. The reference signal transmission component 725 may be configured as or otherwise support a means for transmitting one or more reference signals to one or more network entities, the one or more reference signals associated with a Doppler estimation procedure for the wireless node, for a set of wireless devices supported by the wireless node, or for both. The signal reception component 730 may be configured as or otherwise support a means for receiving a first signal from a first device of the set of wireless devices supported by the wireless node. In some examples, the signal reception component 730 may be configured as or otherwise support a means for receiving a second signal from a second device of the set of wireless devices supported by the wireless node. The information aggregation component 735 may be configured as or otherwise support a means for aggregating information from the first signal and the second signal based on receiving the first signal from the first device and receiving the second signal from the second device. The message transmission component 740 may be configured as or otherwise support a means for transmitting, to the one or more network entities, a message including the aggregated information from the first signal and the second signal based on the Doppler estimation procedure being for the wireless node, for the set of wireless devices supported by the wireless node, or for both.

In some examples, the Doppler compensation parameter transmission component 745 may be configured as or otherwise support a means for transmitting, to the one or more network entities as part of the Doppler estimation procedure, one or more Doppler compensation parameters associated with the wireless node, one or more wireless devices of the set of wireless devices, or a combination thereof.

In some examples, the reference signal transmission component 725 may be configured as or otherwise support a means for transmitting, to the one or more network entities as part of the Doppler estimation procedure, the one or more reference signals using one or more beams, where each beam of the one or more beams is associated with a respective subset of Doppler compensation parameters of a set of one or more Doppler compensation parameters.

In some examples, the one or more reference signals are based on each wireless device of the set of wireless devices operating in a first communication mode, a second communication mode, or a combination thereof.

In some examples, the signal reception component 730 may be configured as or otherwise support a means for receiving, from multiple wireless devices of the set of wireless devices, respective sets of control signals based on the multiple wireless devices operating in accordance with the first communication mode. In some examples, the message transmission component 740 may be configured as or otherwise support a means for transmitting the message to the one or more network entities, where the message includes aggregated control information from the respective sets of control signals.

In some examples, the signal reception component 730 may be configured as or otherwise support a means for receiving, from multiple wireless devices of the set of wireless devices, respective sets of signals including control information and data based on the multiple wireless devices operating in accordance with the second communication mode. In some examples, the message transmission component 740 may be configured as or otherwise support a means for transmitting multiple messages including the message to the one or more network entities, where the multiple messages include a first set of messages including aggregated control information from the multiple wireless devices and a second set of messages including aggregated data from the multiple wireless devices.

In some examples, the wireless node is a vehicle mounted integrated access and backhaul node.

In some examples, the physical parameter transmission component 750 may be configured as or otherwise support a means for transmitting to each network entity of the one or more network entities a respective set of physical parameters, where each respective set of physical parameters includes a location, a speed, and an angle between the wireless node and a network entity associated with the respective set of physical parameters.

In some examples, the wireless node communicates with each wireless device of the set of wireless devices via sidelink.

In some examples, the wireless node communicates with a given wireless device of the set of wireless devices based on a channel condition between the wireless node and the given wireless device being above a channel condition threshold, a loading condition between the wireless node and the given wireless device being above a loading condition threshold, or both.

In some examples, the one or more network entities includes one or more transmission reception points.

In some examples, the physical parameter transmission component 750 may be configured as or otherwise support a means for transmitting, to the one or more network entities, signaling indicating that the wireless node and the set of wireless devices are operating in a speed environment that is classified as a high-speed environment.

Figure 8:
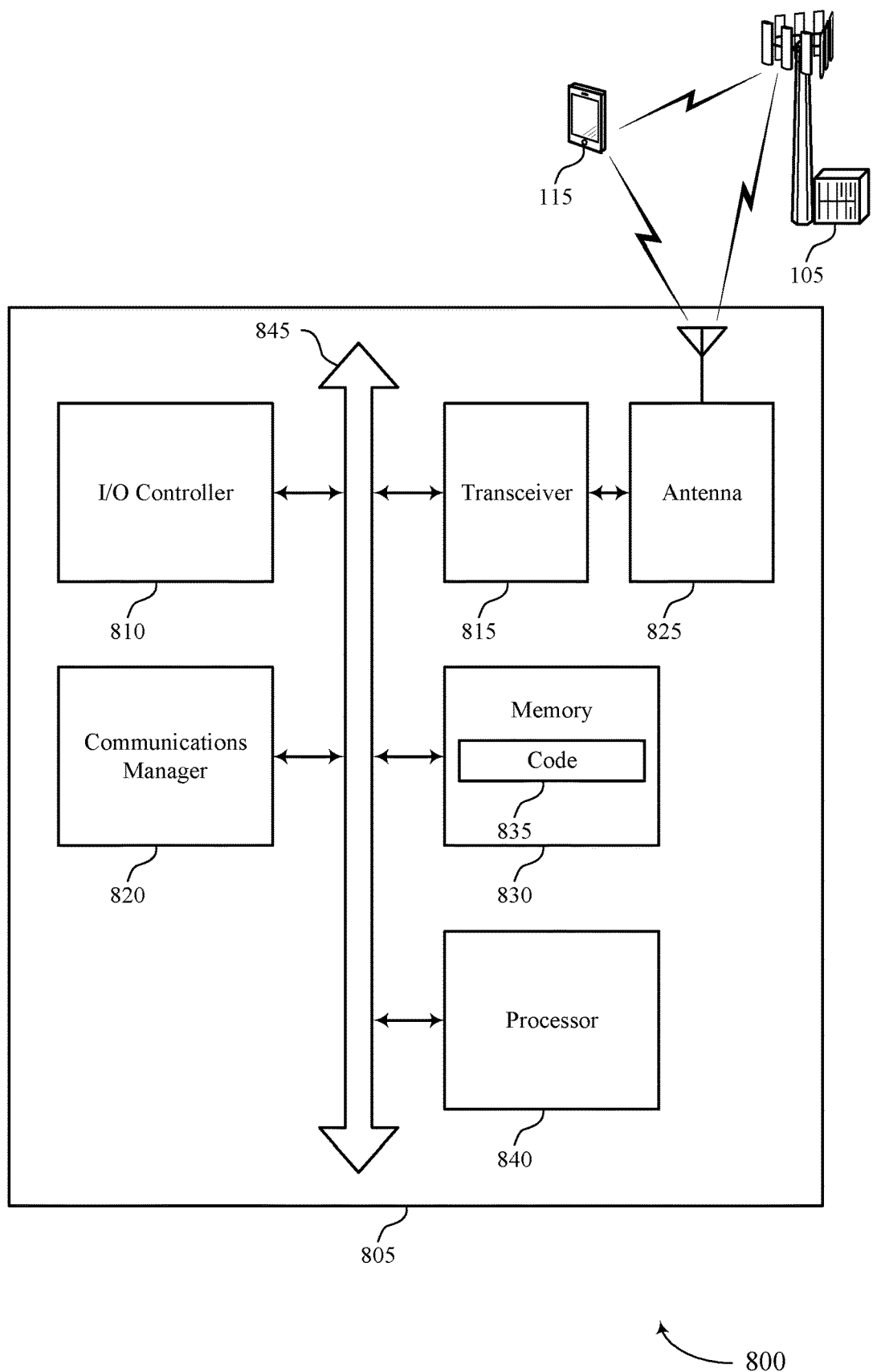
FIG. 8 shows a diagram of a system including a device that supports beam specific pre-compensation for wireless devices in a high speed SFN in accordance with aspects of the present disclosure.

FIG. 8 shows a diagram of a system 800 including a device 805 that supports beam specific pre-compensation for wireless devices in a high speed SFN in accordance with aspects of the present disclosure. The device 805 may be an example of or include the components of a device 505, a device 605, or a UE 115 as described herein. The device 805 may communicate wirelessly with one or more network entities 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beam specific pre-compensation for wireless devices in a high speed SFN). For example, the device 805 or a component of the device 805 may include a processor 840 and memory 830 coupled with or to the processor 840, the processor 840 and memory 830 configured to perform various functions described herein.

The communications manager 820 may support wireless communications at a wireless node in accordance with examples as disclosed herein. For example, the communications manager 820 may be configured as or otherwise support a means for transmitting one or more reference signals to one or more network entities, the one or more reference signals associated with a Doppler estimation procedure for the wireless node, for a set of wireless devices supported by the wireless node, or for both. The communications manager 820 may be configured as or otherwise support a means for receiving a first signal from a first device of the set of wireless devices supported by the wireless node. The communications manager 820 may be configured as or otherwise support a means for receiving a second signal from a second device of the set of wireless devices supported by the wireless node. The communications manager 820 may be configured as or otherwise support a means for aggregating information from the first signal and the second signal based on receiving the first signal from the first device and receiving the second signal from the second device. The communications manager 820 may be configured as or otherwise support a means for transmitting, to the one or more network entities, a message including the aggregated information from the first signal and the second signal based on the Doppler estimation procedure being for the wireless node, for the set of wireless devices supported by the wireless node, or for both.

By including or configuring the communications manager 820 in accordance with examples as described herein, the device 805 may support techniques for signal aggregation from of signals from multiple wireless devices which may result in improved communication reliability for devices operating in an HST, reduced latency, improved user experience related to reduced processing, reduced power consumption, more efficient utilization of communication resources, improved coordination between devices, and a reduction in signaling overhead for the wireless network.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of beam specific pre-compensation for wireless devices in a high speed SFN as described herein, or the processor 840 and the memory 830 may be otherwise configured to perform or support such operations.

Figure 9:
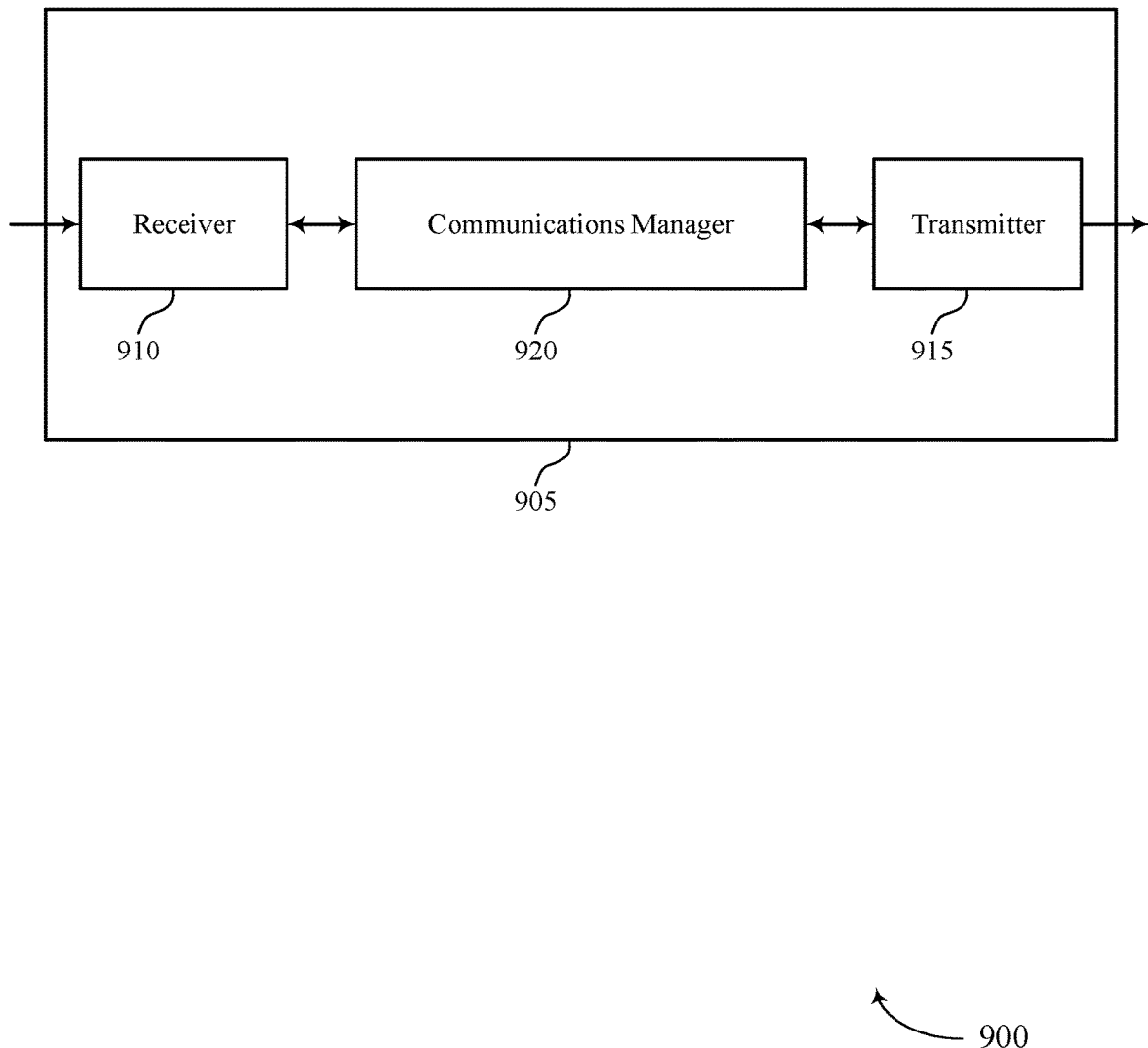
FIGS. 9 and 10 show block diagrams of devices that support beam specific pre-compensation for wireless devices in a high speed SFN in accordance with aspects of the present disclosure.

FIG. 9 shows a block diagram 900 of a device 905 that supports beam specific pre-compensation for wireless devices in a high speed SFN in accordance with aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to beam specific pre-compensation for wireless devices in a high speed SFN). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to beam specific pre-compensation for wireless devices in a high speed SFN). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of beam specific pre-compensation for wireless devices in a high speed SFN as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network entity in accordance with examples as disclosed herein. For example, the communications manager 920 may be configured as or otherwise support a means for receiving, from a wireless node, one or more reference signals associated with a Doppler estimation procedure for the wireless node, a set of wireless devices supported by the wireless node, or both. The communications manager 920 may be configured as or otherwise support a means for generating a set of Doppler compensation parameters associated with the wireless node, the set of wireless devices, or a combination thereof based on receiving the one or more reference signals associated with the Doppler estimation procedure. The communications manager 920 may be configured as or otherwise support a means for communicating with the wireless node, at least one wireless device of the set of wireless devices supported by the wireless node, or both based on the set of Doppler compensation parameters.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for signal aggregation from of signals from multiple wireless devices which may result in reduced processing, reduced power consumption, more efficient utilization of communication resources for the wireless network.

Figure 10:
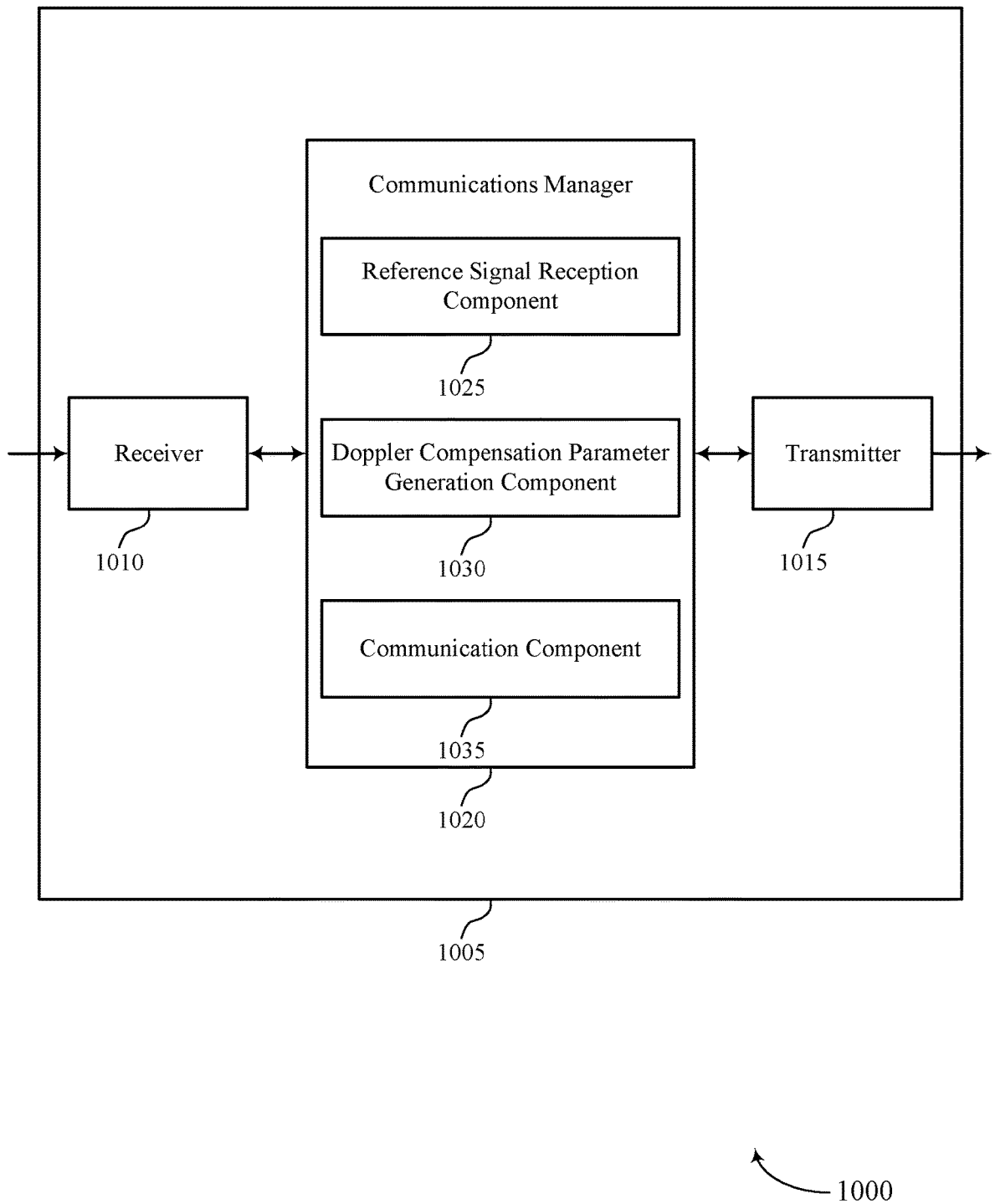

FIG. 10 shows a block diagram 1000 of a device 1005 that supports beam specific pre-compensation for wireless devices in a high speed SFN in accordance with aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam specific pre-compensation for wireless devices in a high speed SFN). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam specific pre-compensation for wireless devices in a high speed SFN). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of beam specific pre-compensation for wireless devices in a high speed SFN as described herein. For example, the communications manager 1020 may include a reference signal reception component 1025, a Doppler compensation parameter generation component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a network entity in accordance with examples as disclosed herein. The reference signal reception component 1025 may be configured as or otherwise support a means for receiving, from a wireless node, one or more reference signals associated with a Doppler estimation procedure for the wireless node, a set of wireless devices supported by the wireless node, or both. The Doppler compensation parameter generation component 1030 may be configured as or otherwise support a means for generating a set of Doppler compensation parameters associated with the wireless node, the set of wireless devices, or a combination thereof based on receiving the one or more reference signals associated with the Doppler estimation procedure. The communication component 1035 may be configured as or otherwise support a means for communicating with the wireless node, at least one wireless device of the set of wireless devices supported by the wireless node, or both based on the set of Doppler compensation parameters.

Figure 11:
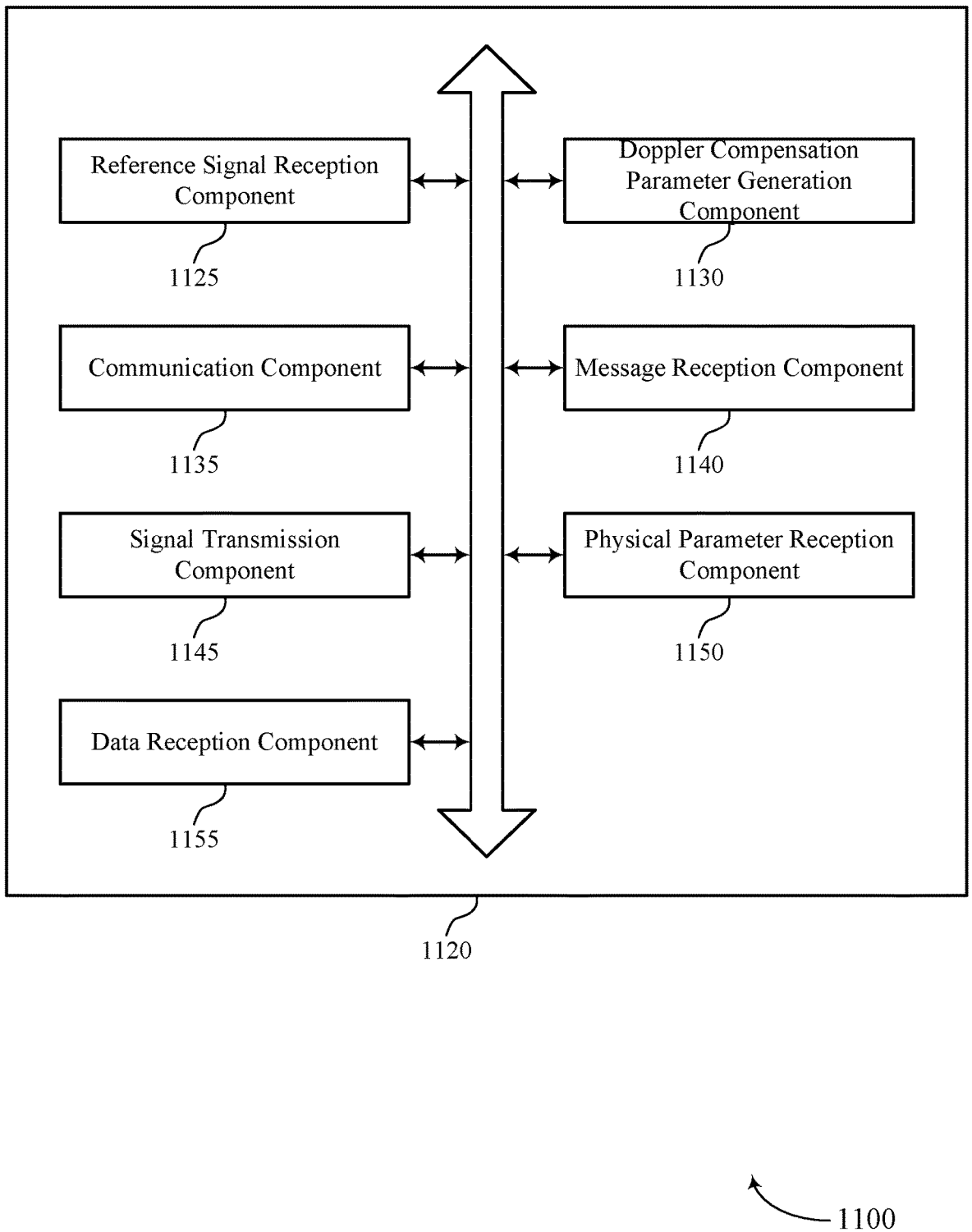
FIG. 11 shows a block diagram of a communications manager that supports beam specific pre-compensation for wireless devices in a high speed SFN in accordance with aspects of the present disclosure.

FIG. 11 shows a block diagram 1100 of a communications manager 1120 that supports beam specific pre-compensation for wireless devices in a high speed SFN in accordance with aspects of the present disclosure. The communications manager 1120 may be an example of aspects of a communications manager 920, a communications manager 1020, or both, as described herein. The communications manager 1120, or various components thereof, may be an example of means for performing various aspects of beam specific pre-compensation for wireless devices in a high speed SFN as described herein. For example, the communications manager 1120 may include a reference signal reception component 1125, a Doppler compensation parameter generation component 1130, a communication component 1135, a message reception component 1140, a signal transmission component 1145, a physical parameter reception component 1150, a data reception component 1155, or any combination thereof. Each of these components may communicate, directly or indirectly, with one another (e.g., via one or more buses).

The communications manager 1120 may support wireless communications at a network entity in accordance with examples as disclosed herein. The reference signal reception component 1125 may be configured as or otherwise support a means for receiving, from a wireless node, one or more reference signals associated with a Doppler estimation procedure for the wireless node, a set of wireless devices supported by the wireless node, or both. The Doppler compensation parameter generation component 1130 may be configured as or otherwise support a means for generating a set of Doppler compensation parameters associated with the wireless node, the set of wireless devices, or a combination thereof based on receiving the one or more reference signals associated with the Doppler estimation procedure. The communication component 1135 may be configured as or otherwise support a means for communicating with the wireless node, at least one wireless device of the set of wireless devices supported by the wireless node, or both based on the set of Doppler compensation parameters.

In some examples, the reference signal reception component 1125 may be configured as or otherwise support a means for receiving, as part of the Doppler estimation procedure, the one or more reference signals using one or more beams. In some examples, the Doppler compensation parameter generation component 1130 may be configured as or otherwise support a means for generating the set of Doppler compensation parameters based on receiving the one or more reference signals, where each beam of the one or more beams is associated with a respective subset of Doppler compensation parameters of the one or more Doppler compensation parameters.

In some examples, to support communicating with the wireless node, the message reception component 1140 may be configured as or otherwise support a means for receiving a first message including aggregated control information from respective sets of control signals associated with the set of wireless devices.

In some examples, the signal transmission component 1145 may be configured as or otherwise support a means for transmitting, to the wireless node, control signaling associated with the set of wireless devices based on receiving the aggregated control information. In some examples, the data reception component 1155 may be configured as or otherwise support a means for receiving, from the at least one wireless device of the set of wireless devices, a data message based on transmitting the control signaling.

In some examples, to support communicating with the wireless node, the message reception component 1140 may be configured as or otherwise support a means for receiving a first set of messages including aggregated control information associated with the set of wireless devices and a second set of messages including aggregated data associated with the set of wireless devices.

In some examples, the signal transmission component 1145 may be configured as or otherwise support a means for transmitting, to the wireless node, control signaling associated with the set of wireless devices based on receiving the first set of messages. In some examples, the signal transmission component 1145 may be configured as or otherwise support a means for transmitting, to the wireless node, one or more feedback messages associated with the set of wireless devices based on receiving the second set of messages.

In some examples, to support communicating with the at least one wireless device of the set of wireless devices supported by the wireless node, the message reception component 1140 may be configured as or otherwise support a means for receiving, from the wireless node, a first message including control information associated with the at least one wireless device. In some examples, to support communicating with the at least one wireless device of the set of wireless devices supported by the wireless node, the signal transmission component 1145 may be configured as or otherwise support a means for transmitting, to the wireless node, control signaling for the at least one wireless device based on receiving the first message. In some examples, to support communicating with the at least one wireless device of the set of wireless devices supported by the wireless node, the signal transmission component 1145 may be configured as or otherwise support a means for communicating one or more data messages with the at least one wireless device based on the control signaling.

In some examples, the wireless node is a vehicle mounted integrated access and backhaul node.

In some examples, the physical parameter reception component 1150 may be configured as or otherwise support a means for receiving a set of physical parameters, where the set of physical parameters include a location, a speed, and an angle between the wireless node and the network entity.

In some examples, the network entity includes one or more transmission reception points.

In some examples, the physical parameter reception component 1150 may be configured as or otherwise support a means for receiving signaling indicating that the wireless node and the set of wireless devices are operating in a speed environment that is classified as a high-speed environment.

Figure 12:
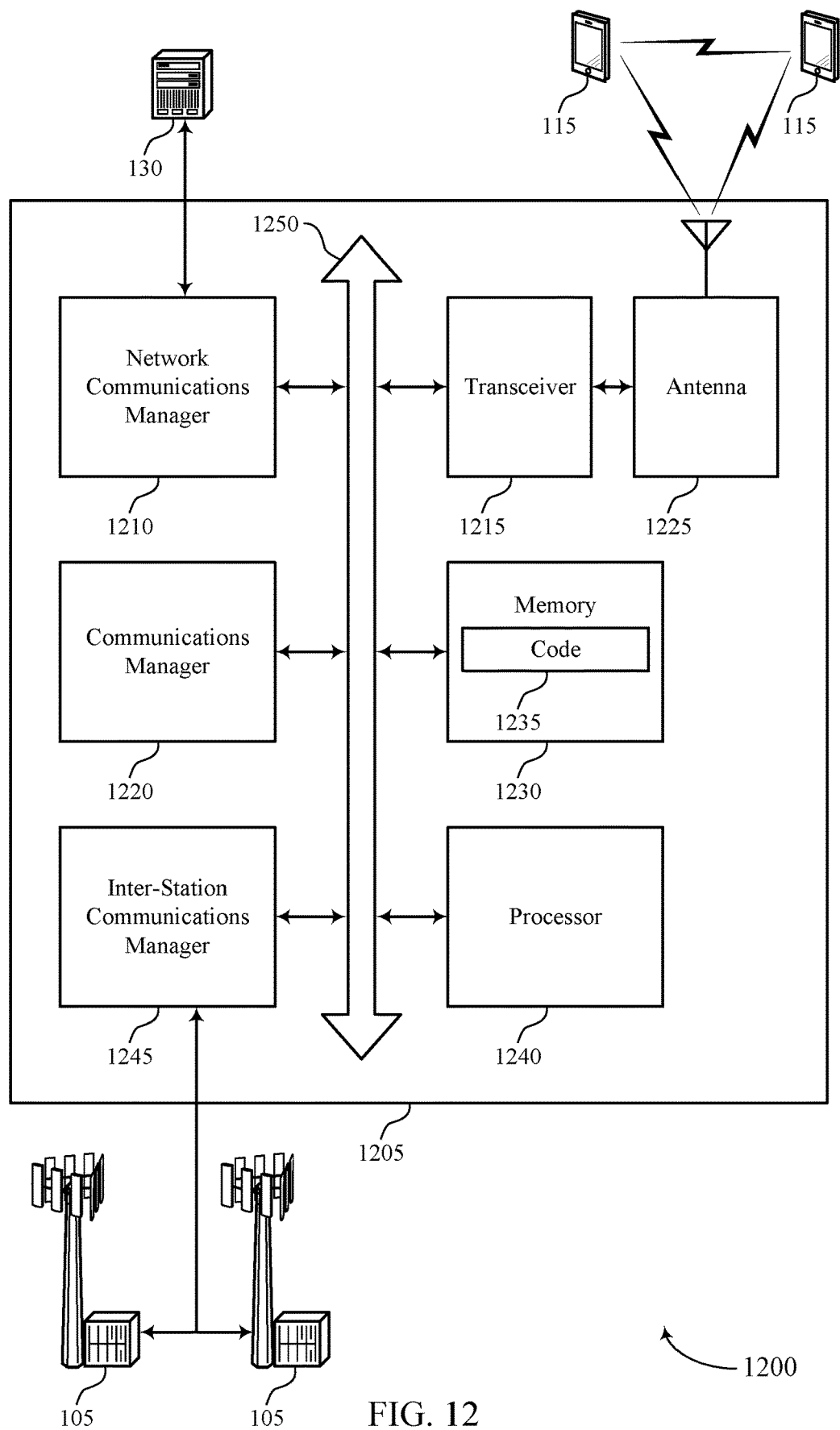
FIG. 12 shows a diagram of a system including a device that supports beam specific pre-compensation for wireless devices in a high speed SFN in accordance with aspects of the present disclosure.

FIG. 12 shows a diagram of a system 1200 including a device 1205 that supports beam specific pre-compensation for wireless devices in a high speed SFN in accordance with aspects of the present disclosure. The device 1205 may be an example of or include the components of a device 905, a device 1005, or a network entity 105 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting beam specific pre-compensation for wireless devices in a high speed SFN). For example, the device 1205 or a component of the device 1205 may include a processor 1240 and memory 1230 coupled with or to the processor 1240, the processor 1240 and memory 1230 configured to perform various functions described herein.

The inter-station communications manager 1245 may manage communications with other network entities 105, and may include a controller or scheduler for controlling communications with UEs 115 in cooperation with other network entities 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for receiving, from a wireless node, one or more reference signals associated with a Doppler estimation procedure for the wireless node, a set of wireless devices supported by the wireless node, or both. The communications manager 1220 may be configured as or otherwise support a means for generating a set of Doppler compensation parameters associated with the wireless node, the set of wireless devices, or a combination thereof based on receiving the one or more reference signals associated with the Doppler estimation procedure. The communications manager 1220 may be configured as or otherwise support a means for communicating with the wireless node, at least one wireless device of the set of wireless devices supported by the wireless node, or both based on the set of Doppler compensation parameters.

By including or configuring the communications manager 1220 in accordance with examples as described herein, the device 1205 may support techniques for signal aggregation from of signals from multiple wireless devices which may result in improved communication reliability for devices operating in an HST, reduced latency, improved user experience related to reduced processing, reduced power consumption, more efficient utilization of communication resources, improved coordination between devices, and a reduction in signaling overhead for the wireless network.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of beam specific pre-compensation for wireless devices in a high speed SFN as described herein, or the processor 1240 and the memory 1230 may be otherwise configured to perform or support such operations.

Figure 13:
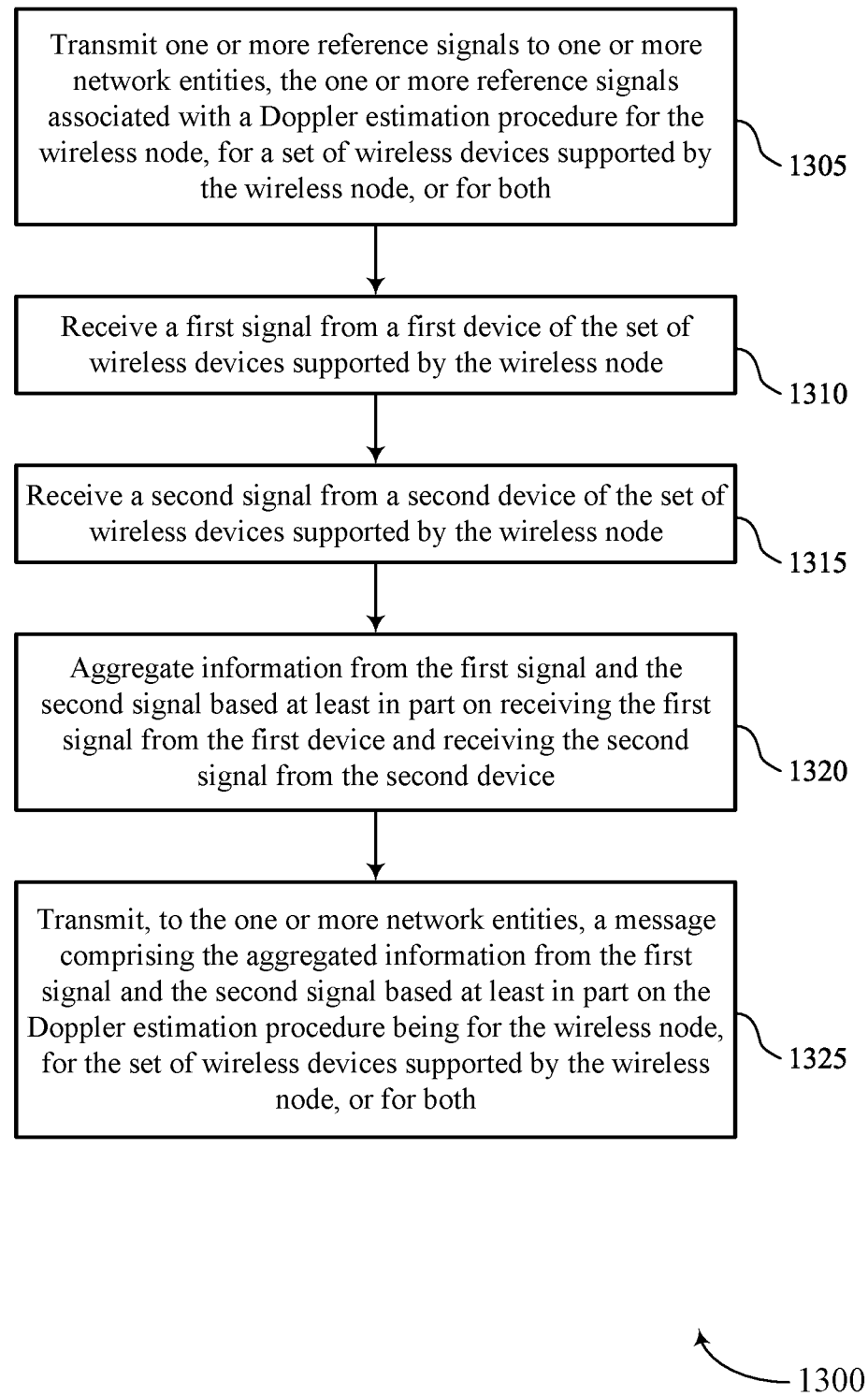
FIGS. 13 and 14 show flowcharts illustrating methods that support beam specific pre-compensation for wireless devices in a high speed SFN in accordance with aspects of the present disclosure.

FIG. 13 shows a flowchart illustrating a method 1300 that supports beam specific pre-compensation for wireless devices in a high speed SFN in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting one or more reference signals to one or more network entities, the one or more reference signals associated with a Doppler estimation procedure for the wireless node, for a set of wireless devices supported by the wireless node, or for both. The operations of 1305 may be performed in accordance with examples as disclosed herein. In some examples, aspects of the operations of 1305 may be performed by a reference signal transmission component 725 as described with reference to FIG. 7.

At 1310, the method may include receiving a first signal from a first device of the set of wireless devices supported by the wireless node. The operations of 1310 may be performed in accordance with examples as disclosed herein. In some examples, aspects of the operations of 1310 may be performed by a signal reception component 730 as described with reference to FIG. 7.

At 1315, the method may include receiving a second signal from a second device of the set of wireless devices supported by the wireless node. The operations of 1315 may be performed in accordance with examples as disclosed herein. In some examples, aspects of the operations of 1315 may be performed by a signal reception component 730 as described with reference to FIG. 7.

At 1320, the method may include aggregating information from the first signal and the second signal based on receiving the first signal from the first device and receiving the second signal from the second device. The operations of 1320 may be performed in accordance with examples as disclosed herein. In some examples, aspects of the operations of 1320 may be performed by an information aggregation component 735 as described with reference to FIG. 7.

At 1325, the method may include transmitting, to the one or more network entities, a message including the aggregated information from the first signal and the second signal based on the Doppler estimation procedure being for the wireless node, for the set of wireless devices supported by the wireless node, or for both. The operations of 1325 may be performed in accordance with examples as disclosed herein. In some examples, aspects of the operations of 1325 may be performed by a message transmission component 740 as described with reference to FIG. 7.

Figure 14:
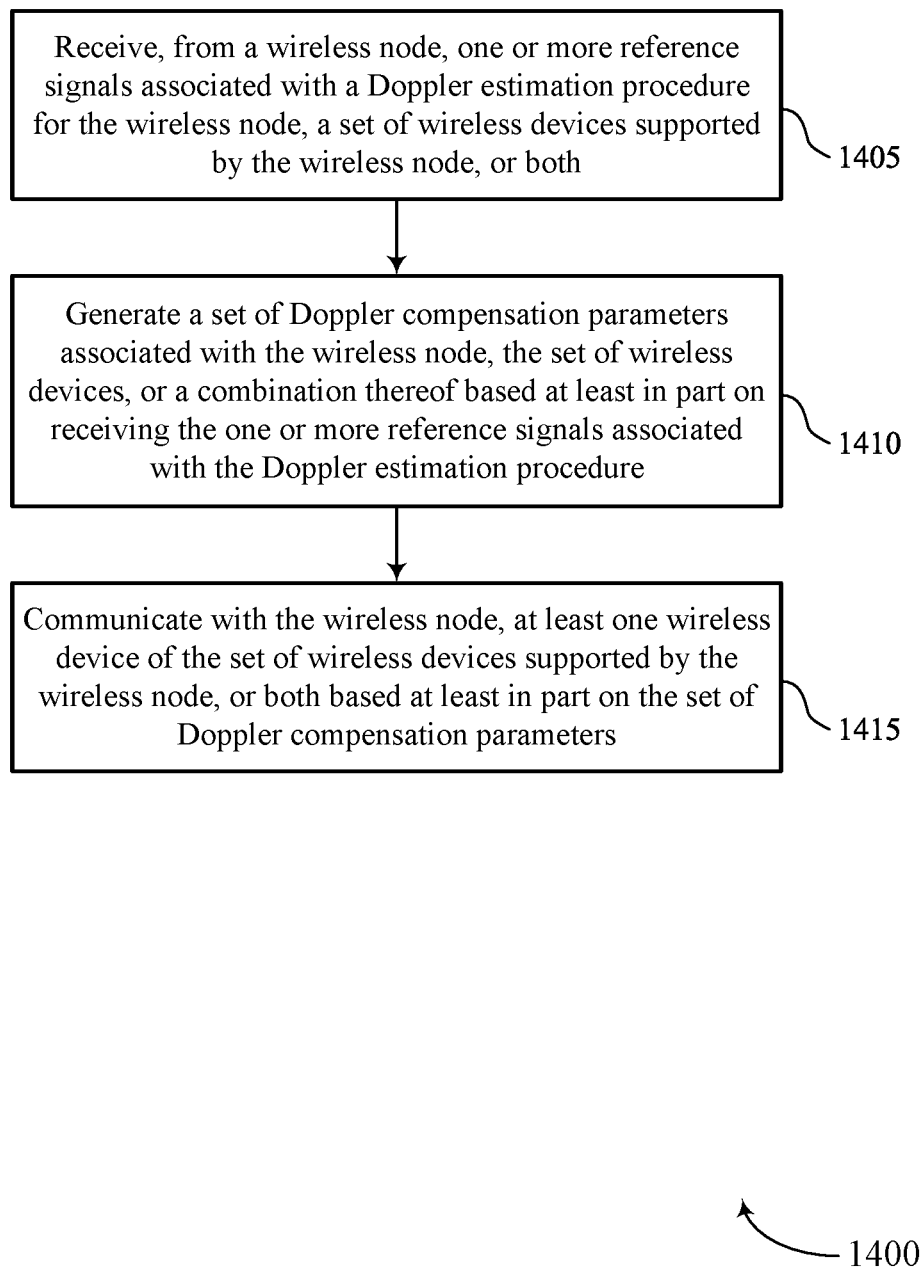

FIG. 14 shows a flowchart illustrating a method 1400 that supports beam specific pre-compensation for wireless devices in a high speed SFN in accordance with aspects of the present disclosure. The operations of the method 1400 may be implemented by a network entity or its components as described herein. For example, the operations of the method 1400 may be performed by a network entity 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1405, the method may include receiving, from a wireless node, one or more reference signals associated with a Doppler estimation procedure for the wireless node, a set of wireless devices supported by the wireless node, or both. The operations of 1405 may be performed in accordance with examples as disclosed herein. In some examples, aspects of the operations of 1405 may be performed by a reference signal reception component 1125 as described with reference to FIG. 11.

At 1410, the method may include generating a set of Doppler compensation parameters associated with the wireless node, the set of wireless devices, or a combination thereof based on receiving the one or more reference signals associated with the Doppler estimation procedure. The operations of 1410 may be performed in accordance with examples as disclosed herein. In some examples, aspects of the operations of 1410 may be performed by a Doppler compensation parameter generation component 1130 as described with reference to FIG. 11.

At 1415, the method may include communicating with the wireless node, at least one wireless device of the set of wireless devices supported by the wireless node, or both based on the set of Doppler compensation parameters. The operations of 1415 may be performed in accordance with examples as disclosed herein. In some examples, aspects of the operations of 1415 may be performed by a communication component 1135 as described with reference to FIG. 11.

The following provides an overview of aspects of the present disclosure:

Aspect 1: A method for wireless communications at a wireless node, including: transmitting one or more reference signals to one or more network entities, the one or more reference signals associated with a Doppler estimation procedure for the wireless node, for a set of wireless devices supported by the wireless node, or for both; receiving a first signal from a first device of the set of wireless devices supported by the wireless node; receiving a second signal from a second device of the set of wireless devices supported by the wireless node; aggregating information from the first signal and the second signal based on receiving the first signal from the first device and receiving the second signal from the second device; and transmitting, to the one or more network entities, a message including the aggregated information from the first signal and the second signal based on the Doppler estimation procedure being for the wireless node, for the set of wireless devices supported by the wireless node, or for both.

Aspect 2: The method of aspect 1, further including: transmitting, to the one or more network entities as part of the Doppler estimation procedure, one or more Doppler compensation parameters associated with the wireless node, one or more wireless devices of the set of wireless devices, or a combination thereof.

Aspect 3: The method of any of aspects 1 through 2, further including: transmitting, to the one or more network entities as part of the Doppler estimation procedure, the one or more reference signals using one or more beams, where each beam of the one or more beams is associated with a respective subset of Doppler compensation parameters of a set of one or more Doppler compensation parameters.

Aspect 4: The method of any of aspects 1 through 3, where the one or more reference signals are based on each wireless device of the set of wireless devices operating in a first communication mode, a second communication mode, or a combination thereof.

Aspect 5: The method of aspect 4, further including: receiving, from multiple wireless devices of the set of wireless devices, respective sets of control signals based on the multiple wireless devices operating in accordance with the first communication mode; and transmitting the message to the one or more network entities, where the message includes aggregated control information from the respective sets of control signals.

Aspect 6: The method of any of aspects 4 through 5, further including: receiving, from multiple wireless devices of the set of wireless devices, respective sets of signals including control information and data based on the multiple wireless devices operating in accordance with the second communication mode; and transmitting multiple messages including the message to the one or more network entities, where the multiple messages comprise a first set of messages including aggregated control information from the multiple wireless devices and a second set of messages including aggregated data from the multiple wireless devices.

Aspect 7: The method of any of aspects 1 through 6, where the wireless node is a vehicle mounted IAB node.

Aspect 8: The method of any of aspects 1 through 7, further including: transmitting to each network entity of the one or more network entities a respective set of physical parameters, where each respective set of physical parameters includes a location, a speed, and an angle between the wireless node and a network entity associated with the respective set of physical parameters.

Aspect 9: The method of any of aspects 1 through 8, where the wireless node communicates with each wireless device of the set of wireless devices via sidelink.

Aspect 10: The method of any of aspects 1 through 9, where the wireless node communicates with a given wireless device of the set of wireless devices based on a channel condition between the wireless node and the given wireless device being above a channel condition threshold, a loading condition between the wireless node and the given wireless device being above a loading condition threshold, or both.

Aspect 11: The method of any of aspects 1 through 10, where the one or more network entities includes one or more TRPs.

Aspect 12: The method of any of aspects 1 through 11, further including: transmitting, to the one or more network entities, signaling indicating that the wireless node and the set of wireless devices are operating in a speed environment that is classified as a high-speed environment.

Aspect 13: A method for wireless communications at a network entity, including: receiving, from a wireless node, one or more reference signals associated with a Doppler estimation procedure for the wireless node, a set of wireless devices supported by the wireless node, or both; generating a set of Doppler compensation parameters associated with the wireless node, the set of wireless devices, or a combination thereof based on receiving the one or more reference signals associated with the Doppler estimation procedure; and communicating with the wireless node, at least one wireless device of the set of wireless devices supported by the wireless node, or both based on the set of Doppler compensation parameters.

Aspect 14: The method of aspect 13, further including: receiving, as part of the Doppler estimation procedure, the one or more reference signals using one or more beams; and generating the set of Doppler compensation parameters based on receiving the one or more reference signals, where each beam of the one or more beams is associated with a respective subset of Doppler compensation parameters of the one or more Doppler compensation parameters.

Aspect 15: The method of any of aspects 13 through 14, where communicating with the wireless node includes: receiving a first message including aggregated control information from respective sets of control signals associated with the set of wireless devices.

Aspect 16: The method of aspect 15, further including: transmitting, to the wireless node, control signaling associated with the set of wireless devices based on receiving the aggregated control information; and receiving, from the at least one wireless device of the set of wireless devices, a data message based on transmitting the control signaling.

Aspect 17: The method of any of aspects 13 through 16, where communicating with the wireless node includes: receiving a first set of messages including aggregated control information associated with the set of wireless devices and a second set of messages including aggregated data associated with the set of wireless devices.

Aspect 18: The method of aspect 17, further including: transmitting, to the wireless node, control signaling associated with the set of wireless devices based on receiving the first set of messages; and transmitting, to the wireless node, one or more feedback messages associated with the set of wireless devices based on receiving the second set of messages.

Aspect 19: The method of any of aspects 13 through 18, where communicating with the at least one wireless device of the set of wireless devices supported by the wireless node includes: receiving, from the wireless node, a first message including control information associated with the at least one wireless device; transmitting, to the wireless node, control signaling for the at least one wireless device based on receiving the first message; communicating one or more data messages with the at least one wireless device based on the control signaling.

Aspect 20: The method of any of aspects 13 through 19, where the wireless node is a vehicle mounted IAB node.

Aspect 21: The method of any of aspects 13 through 20, further including: receiving a set of physical parameters, where the set of physical parameters comprise a location, a speed, and an angle between the wireless node and the network entity.

Aspect 22: The method of any of aspects 13 through 21, where the network entity includes one or more TRPs.

Aspect 23: The method of any of aspects 13 through 22, further including: receiving signaling indicating that the wireless node and the set of wireless devices are operating in a speed environment that is classified as a high-speed environment.

Aspect 24: An apparatus for wireless communications at a wireless node, including a processor; memory coupled with the processor; and instructions stored in the memory and executable by the processor to cause the apparatus to perform a method of any of aspects 1 through 12.

Aspect 25: An apparatus for wireless communications at a wireless node, including at least one means for performing a method of any of aspects 1 through 12.

Aspect 26: A non-transitory computer-readable medium storing code for wireless communications at a wireless node, the code including instructions executable by a processor to perform a method of any of aspects 1 through 12.

Aspect 27: An apparatus for wireless communications at a network entity, including a processor; memory coupled with the processor; and instructions stored in the memory and executable by the processor to cause the apparatus to perform a method of any of aspects 13 through 23.

Aspect 28: An apparatus for wireless communications at a network entity, including at least one means for performing a method of any of aspects 13 through 23.

Aspect 29: A non-transitory computer-readable medium storing code for wireless communications at a network entity, the code including instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a wireless node, comprising:
    one or more memories; and
    one or more processors coupled to the one or more memories, wherein the one or more processors are configured to:
    transmit one or more reference signals to one or more network entities, the one or more reference signals associated with a Doppler estimation procedure for the wireless node, for a set of wireless devices supported by the wireless node, or for both;
    receive a first signal from a first device of the set of wireless devices supported by the wireless node, wherein first information comprised in the first signal is based at least in part on a first Doppler estimation capability of the first device;
    receive a second signal from a second device of the set of wireless devices supported by the wireless node, wherein second information comprised in the second signal is based at least in part on a second Doppler estimation capability of the second device, wherein the second device is unable to generate the one or more reference signals associated with the Doppler estimation procedure, and wherein the second device is located on a same moving vehicle as the wireless node;
    aggregate information from the first signal and the second signal based at least in part on receiving the first signal from the first device and receiving the second signal from the second device; and
    transmit, to the one or more network entities, a message comprising the aggregated information from the first signal and the second signal based at least in part on the Doppler estimation procedure being for the wireless node, for the set of wireless devices supported by the wireless node, or for both.

2. The apparatus of claim 1, wherein the one or more processors are further configured to:
    transmit, to the one or more network entities as part of the Doppler estimation procedure, one or more Doppler compensation parameters associated with the wireless node, one or more wireless devices of the set of wireless devices, or a combination thereof.

3. The apparatus of claim 1, wherein the one or more processors are further configured to:
    transmit, to the one or more network entities as part of the Doppler estimation procedure, the one or more reference signals using one or more beams, wherein each beam of the one or more beams is associated with a respective subset of Doppler compensation parameters of a set of one or more Doppler compensation parameters.

4. The apparatus of claim 1, wherein the one or more reference signals are based at least in part on each wireless device of the set of wireless devices operating in a first communication mode, a second communication mode, or a combination thereof.

5. The apparatus of claim 4, wherein the one or more processors are further configured to:
    receive, from multiple wireless devices of the set of wireless devices, respective sets of control signals based at least in part on the multiple wireless devices operating in accordance with the first communication mode; and
    transmit the message to the one or more network entities, wherein the message comprises aggregated control information from the respective sets of control signals.

6. The apparatus of claim 4, wherein the one or more processors are further configured to:
    receive, from multiple wireless devices of the set of wireless devices, respective sets of signals comprising control information and data based at least in part on the multiple wireless devices operating in accordance with the second communication mode; and
    transmit multiple messages including the message to the one or more network entities, wherein the multiple messages comprise a first set of messages comprising aggregated control information from the multiple wireless devices and a second set of messages comprising aggregated data from the multiple wireless devices.

7. The apparatus of claim 1, wherein the wireless node is a vehicle mounted integrated access and backhaul node.

8. The apparatus of claim 1, wherein the one or more processors are further configured to:
    transmit to each network entity of the one or more network entities a respective set of physical parameters, wherein each respective set of physical parameters comprises a location, a speed, and an angle between the wireless node and a network entity associated with the respective set of physical parameters.

9. The apparatus of claim 1, wherein the wireless node communicates with each wireless device of the set of wireless devices via sidelink.

10. The apparatus of claim 1, wherein the wireless node communicates with a given wireless device of the set of wireless devices based at least in part on a channel condition between the wireless node and the given wireless device being above a channel condition threshold, a loading condition between the wireless node and the given wireless device being above a loading condition threshold, or both.

11. The apparatus of claim 1, wherein:
the one or more network entities comprise one or more transmission reception points.

12. The apparatus of claim 1, wherein the one or more processors are further configured to:
transmit, to the one or more network entities, signaling indicating that the wireless node and the set of wireless devices are operating in a speed environment that is classified as a high-speed environment.

13. A method for wireless communications at a wireless node, comprising:
transmitting one or more reference signals to one or more network entities, the one or more reference signals associated with a Doppler estimation procedure for the wireless node, for a set of wireless devices supported by the wireless node, or for both;
receiving a first signal from a first device of the set of wireless devices supported by the wireless node, wherein first information comprised in the first signal is based at least in part on a first Doppler estimation capability of the first device;
receiving a second signal from a second device of the set of wireless devices supported by the wireless node, wherein second information comprised in the second signal is based at least in part on a second Doppler estimation capability of the second device, wherein the second device is unable to generate the one or more reference signals associated with the Doppler estimation procedure, and wherein the second device is located on a same moving vehicle as the wireless node;
aggregating information from the first signal and the second signal based at least in part on receiving the first signal from the first device and receiving the second signal from the second device; and
transmitting, to the one or more network entities, a message comprising the aggregated information from the first signal and the second signal based at least in part on the Doppler estimation procedure being for the wireless node, for the set of wireless devices supported by the wireless node, or for both.

14. The method of claim 13, further comprising:
transmitting, to the one or more network entities as part of the Doppler estimation procedure, one or more Doppler compensation parameters associated with the wireless node, one or more wireless devices of the set of wireless devices, or a combination thereof.

15. The method of claim 13, further comprising:
transmitting, to the one or more network entities as part of the Doppler estimation procedure, the one or more reference signals using one or more beams, wherein each beam of the one or more beams is associated with a respective subset of Doppler compensation parameters of a set of one or more Doppler compensation parameters.

16. The method of claim 13, wherein the one or more reference signals are based at least in part on each wireless device of the set of wireless devices operating in a first communication mode, a second communication mode, or a combination thereof.

17. The method of claim 16, further comprising:
receiving, from multiple wireless devices of the set of wireless devices, respective sets of control signals based at least in part on the multiple wireless devices operating in accordance with the first communication mode; and
transmitting the message to the one or more network entities, wherein the message comprises aggregated control information from the respective sets of control signals.

18. The method of claim 16, further comprising:
receiving, from multiple wireless devices of the set of wireless devices, respective sets of signals comprising control information and data based at least in part on the multiple wireless devices operating in accordance with the second communication mode; and
transmitting multiple messages including the message to the one or more network entities, wherein the multiple messages comprise a first set of messages comprising aggregated control information from the multiple wireless devices and a second set of messages comprising aggregated data from the multiple wireless devices.

\* \* \* \* \*